(12) United States Patent
Otake et al.

(10) Patent No.: US 6,468,035 B1
(45) Date of Patent: Oct. 22, 2002

(54) METHOD AND APPARATUS FOR CONTROLLING AIRPLANE ENGINE

(75) Inventors: Yukio Otake, Suntou-gun (JP); Shinichiro Tanaka, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 245 days.

(21) Appl. No.: 09/652,783

(22) Filed: Aug. 31, 2000

(51) Int. Cl.[7] .............................................. B64C 11/36
(52) U.S. Cl. .............................. 416/1; 416/37; 416/43; 123/436
(58) Field of Search ................................ 416/1, 27, 29, 416/30, 36, 37, 43; 123/436, 399

(56) References Cited

U.S. PATENT DOCUMENTS

| 4,626,170 A | 12/1986 | Dorsch ..................... 416/29 |
| 4,693,670 A | 9/1987 | Hawener et al. ............. 416/25 |
| 6,390,055 B1 * | 5/2002 | Sivashankar et al. ....... 123/295 |

FOREIGN PATENT DOCUMENTS

| JP | 60-76499 | 4/1985 |
| JP | 3-204393 | 9/1991 |
| JP | 4-24200 | 1/1992 |
| JP | 8-324496 | 12/1996 |
| JP | 11-255199 | 9/1999 |

* cited by examiner

Primary Examiner—Edward K. Look
Assistant Examiner—Dwayne J. White
(74) Attorney, Agent, or Firm—Oliff & Berridge, PLC

(57) ABSTRACT

An airplane engine control method and apparatus are provided which form an engine control system easy to operate, which set a reciprocating engine of an airplane in such an operating condition in a partial power mode as to maximize the efficiency of the airframe and the engine as a whole, and which enable setting of suitable partial power in a reciprocating engine with a variable-pitch propeller in such a manner that, when predetermined partial power is set, a relationship expressed by Te $\propto \rho N^2$ is established with respect to the engine torque (Te), the number of engine revolutions (N) and the atmospheric density ($\rho$).

26 Claims, 24 Drawing Sheets

FIG. 7

(1) AIRPLANE SPEED $$J = \frac{V}{ND} \Rightarrow V = JND$$

$$\frac{V_2}{V_1} = \frac{J_2 N_2 D}{J_1 N_1 D} = \frac{N_2}{N_1} = \frac{\frac{N}{K}}{N_1} = \frac{1}{K}$$

$$J_2 = J_1$$

(2) AIRFRAME DRAG $$\frac{Dg_2}{Dg_1} = \frac{K\rho V_2^2}{K\rho V_1^2} = \frac{\left(V_1 \frac{1}{K}\right)^2}{V_1^2} = \frac{1}{K^2}$$

(3) ENGINE TORQUE $$\frac{Te_2}{Te_1} = \frac{\rho N_2^2}{\rho N_1^2} = \frac{\left(\frac{N_1}{K}\right)^2}{N_1^2} = \frac{1}{K^2}$$

(4) PROPELLER THRUST $$\boxed{\begin{array}{c} Th = C_T \rho n^2 D^4 \\ Te = C_Q \rho n^2 D^5 \end{array}} \Rightarrow Th = Te\left(\frac{C_T}{C_Q \cdot D}\right)$$

$$Th_1 = Te_1 \left(\frac{C_T}{C_Q \cdot D}\right)$$

$$\Downarrow$$

$$\frac{Th_2}{Th_1} = \frac{Te_2 \left(\frac{C_{T2}}{C_{Q2} \cdot D}\right)}{Te_1 \left(\frac{C_{T1}}{C_{Q1} \cdot D}\right)} = \frac{Te_2}{Te_1} = \frac{1}{K^2}$$

$$C_{T1} = C_{T2}$$
$$C_{Q1} = C_{Q2}$$

METHOD AND APPARATUS FOR CONTROLLING AIRPLANE ENGINE

TECHNICAL FIELD TO WHICH THE INVENTION BELONGS

The present invention relates to a method and apparatus for controlling an airplane engine and, more particularly, to a method which enables easier control of a reciprocating engine of an airplane and which sets the engine in such an operating condition in a partial power mode as to maximize the efficiency of the airframe and the engine as a whole, and to an apparatus for controlling an airplane engine according to the method.

PRIOR ART

Conventionally, to control drive of a reciprocating engine of a small plane having a variable-pitch propeller, a drive control system is used in which the engine torque is controlled by means of a throttle and a fuel regulator, and in which the number of revolutions of the propeller is controlled by means of a governor.

That is, the throttle sets the amount of air drawn into the engine, the fuel regulator sets the air-fuel ratio, and the governor controls the load on the engine by changing the propeller pitch, thus controlling the engine so that the engine has a set number of revolutions.

This engine drive control is performed by operating the throttle with a throttle lever, operating the fuel regulator with a mixture lever, and operating the governor with a governor lever. A pilot of the airplane sets the number of revolutions of the propeller governor to a desired number by operating the governor lever, adjusts the throttle opening by operating the throttle lever, and controlling the air-fuel ratio setting in the engine by. operating the mixture lever, thereby obtaining the desired engine output.

In the above-described conventional engine drive operating system for a small plane having a variable-pitch propeller, it is necessary for a pilot to perform troublesome steps of operating the three operating levers in order to obtain the desired engine output.

The publication of U.S. Pat. No. 4,626,170 discloses a normal aspiration engine for an airplane with a variable-pitch propeller, which is designed so that the throttle opening and the set number of governor revolutions can be simultaneously controlled with one lever.

In the engine disclosed in this patent publication, a fuel injection controller is provided to control the amount of fuel injected into the engine according to the amount of air drawn into the engine, and the governor and the throttle valve are connected to one power control lever by a link mechanism. In this engine, the set number of revolutions of the propeller governor and the throttle opening are simultaneously changed according to the amount of operation of the power control lever. When the set number of revolutions of the propeller governor is small, the throttle opening is set to a small value. When the set number of revolutions of the propeller governor is large, the throttle opening is set to a large value.

PROBLEM TO BE SOLVED BY THE INVENTION

In general, when an airplane makes a short-distance flight, it flies with full engine power. In contrast, in the course of a long-distance flight, the airplane starts cruising when it reaches a predetermined altitude. During cruising, the airplane flies at 70 to 80% of the maximum engine power. Such power smaller than the maximum power is called partial power. Basically, the fuel efficiency of the engine is improved when such partial power is set.

To consider fuel economy of an airplane, the operating work efficiency of the airframe and the engine of the airplane as a whole, i.e., the flight distance traveled by the airplane consuming a predetermined amount of fuel, including the efficiency of the propeller connected to the engine, i.e., the efficiency at which the engine output is converted into a thrust by the propeller, must be taken into consideration as well as the fuel efficiency of the mounted engine itself.

In the case of the invention described in the specification of U.S. Pat. No. 4,626,170, full opening of the throttle is presupposed with respect to the range of 2000 or more engine revolutions per minute, as shown in FIG. 25. When the throttle is fully open, there is no suction loss in the engine, so that the fuel efficiency of the engine is high.

However, from representation of the relationship between the throttle and the number of engine revolutions and the relationship between the torque and the number of engine revolutions reflecting the former relationship as shown in FIG. 26, it can be understood that a large discrepancy can be seen between an arbitrary point F designating a number of revolutions of 2000 or more and a point G designating the same number of revolutions as the point F on a maximum propeller efficiency line L (on which a relationship expressed by Te $\rho N^2$ is established between the torque Te and the number of engine revolutions Ne) supposed from the relationship between the torque and the number of engine revolutions.

Therefore, it is possible to say that the invention of the above-mentioned U.S. patent is incomplete in terms of fuel economy conditioned by the efficiency of the airframe and the engine of an airplane as a whole including the propeller efficiency.

In view of the above-described circumstances, an object of the present invention is to provide an airplane engine control method and apparatus which can realize an optimal propeller efficiency when partial power is set in an engine of an airplane, and which can set a good operating condition by improving fuel efficiency of the airframe and the engine of the airplane as a whole.

Another object of the present invention is to provide an airplane engine control method and apparatus which can maintain a propeller-efficiency-maximized condition when partial power is set in a normal aspiration engine of an airplane and thereby realize a good operating condition of the airframe and the engine of the airplane as a whole including fuel efficiency of the engine.

Still another object of the present invention is to provide an airplane engine control method and apparatus which can maintain a propeller-efficiency-maximized condition when partial power is set in an engine with a turbocharger of an airplane and thereby realize a good operating condition of the airframe and the engine of the airplane as a whole including fuel efficiency of the engine.

Yet still another object of the present invention is to provide an airplane engine control method and apparatus which can maintain a propeller-efficiency-maximized condition in accordance with a change in the drag of airplane even when the drag of airplane is changed by, for example, a change in weight during a flight and thereby realize a good operating condition of the airframe and the engine of the airplane as a whole including fuel efficiency of the engine.

Yet still another object of the present invention is to provide an airplane engine control method and apparatus which can improve the controllability of an engine of an airplane to be controlled by a pilot while a propeller-efficiency-maximized condition is maintained to realize a good operating condition of the airframe and the engine of the airplane as a whole including fuel efficiency of the engine.

MEANS FOR SOLVING THE PROBLEM

According to the present invention, there is provided a method of controlling a reciprocating engine with a variable-pitch propeller provided on an airplane, in which suitable partial power is set in the engine, the method comprising setting an engine condition such that a relationship represented by Te ∝ ρN² is established with respect to the engine torque (Te), the number of engine revolutions (N) and the atmospheric density (ρ) when predetermined partial power is set in the engine.

1. Explanation of Principle

The inventors of the present invention have achieved the present invention with the aim of improving, as well as the engine fuel efficiency, the fuel efficiency of an airplane conditioned by the efficiency of the airframe and the engine of the airplane as a whole including the propeller efficiency when partial power is set in the engine, and also improving the controllability of the engine to be controlled by a pilot when the partial power is set.

While independent operating systems of a throttle, a fuel regulator, and a governor respectively operated with separate operating levers are conventionally used, one operating lever capable of integrally controlling such three operating systems is provided according to the present invention. To improve the engine controllability, this operating lever is used and operation control is performed by using control means for setting control values for a throttle, a fuel regulator and a governor by comparing the opening angle of the operating lever with prepared maps of the air-fuel ratio, the throttle opening and the number of engine revolutions.

The other object of improving the total fuel efficiency of an airplane according to the present invention corresponds to improving the operating efficiency of the airframe and the engine of the airplane as a whole including the efficiency of the propeller connected to the engine, i.e., the flight distance traveled by the airplane consuming a predetermined amount of fuel, as well as the efficiency of the mounted engine itself, as mentioned above.

To improve the total operating efficiency of an airplane described above, it is necessary to make a study of means for improving the operating efficiency by considering the number of revolutions and the torque of the engine, the propeller efficiency, and the drag of airplane.

A variable-pitch propeller of an airplane according to the present invention is designed so as to obtain a suitable thrust by suitably controlling the pitch angle of propeller blades. Individual propellers connected to different engines vary in propeller characteristics. To study the propeller characteristics of such propellers, it is necessary to consider "advance ratio" and "power coefficient".

The "advance ratio" is a value obtained by dividing the actual speed of an airplane by the geometrical advancement rate, as expressed by the following equation:

$$\text{Advance Ratio } J = \frac{V}{ND}$$

where V is the actual speed of the airplane, N is the number of revolutions of a propeller, and D is the diameter of the propeller.

The power coefficient is a value obtained by dividing the work input to the propeller by the work of air discharged by the propeller, as expressed by the following equation:

$$\text{Power Coefficient } Cp = \frac{2\pi Te}{\rho N^2 D^5}$$

where Te is the engine torque, ρ is the atmospheric density, N is the number of engine revolutions, and D is the diameter of the propeller.

2. Propeller Efficiency

In general, the power of an engine is the product of the torque and the number of revolutions of the engine. Essentially, airplanes are designed so that the propeller efficiency is maximum during operation in a full-power mode. Therefore, if the relationship between the torque and the number of revolutions of an engine when the propeller efficiency is maximum in a full-power mode is examined to recognize a certain low therein, the law may be applied to the engine condition in a partial-power mode to enable maximization of the propeller efficiency in the partial power mode.

On the assumption that the propeller efficiency could be improved in this manner, the inventors of the present invention have studied the relationship between the number of revolutions and the torque of an engine when the propeller efficiency is maximum in a full-power mode, as described below in detail.

(1) Full-Power Mode

In the graph of FIG. 1, the power coefficient Cp, the advance ratio J, the propeller efficiency (%) and the propeller pitch angle β are non-dimensionally expressed with respect to an airplane having a normal aspiration engine. An optimal-efficiency condition of a propeller in a full-power mode has been confirmed in the relationship between the power coefficient Cp and the advance ratio J shown in the graph.

The axis of ordinate represents the power coefficient Cp and the axis of abscissa represents the advance ratio J. The propeller pitch angle β and the propeller efficiency % are also shown in the graph.

In the graph, a coordinate point ① is marked to indicate a condition at a time when the airplane takes off with full power. When the engine operates in the full-power mode, the rated output of the engine is fully extracted. The torque and the number of revolutions are previously set in the engine. Just at the time of leaving the ground, the given power coefficient Cp is uniquely determined since the atmospheric density ρ is constant, and since the diameter D of the propeller is fixed. The determined value of the power coefficient Cp is marked with the coordinate point ①.

Thereafter, if the airplane continues taking-off by operating its engine in the full-power mode without changing the number of revolutions, its speed becomes higher and the advance ratio J also becomes higher according to the advance ratio equation shown above.

Thus, as is apparent from the graph, the advance ratio J represented by the axis of abscissa increases with the acceleration of the airplane while the power coefficient Cp represented by the axis of ordinate is constant. As indicated by the arrow A in the graph, the advance ratio J increases as the flight proceeds. Thereafter, a predetermined value of the advance ratio J is reached at a coordinate point ② simultaneously with proceeding from an accelerating condition into a constant-speed condition at a predetermined altitude.

In this process, if constant-speed control of the propeller with the governor is being performed, the combination of the torque and the number of revolutions is not changed, so that the power coefficient Cp is constant. In this process, the atmospheric density ρ changes since the altitude of the airplane increases. However, in the case of the normal aspiration engine, the engine torque becomes lower in proportion to the atmospheric density ρ. Therefore, the power coefficient Cp is constant irrespective of the atmospheric density ρ. Also, the advance ratio J is constant.

During proceeding from the coordinate point ① to the coordinate point ②, the propeller pitch angle β of the variable-pitch propeller provided on the airplane increases gradually from about 20 degrees at the coordinate point ① to about 28 degrees at the coordinate point ②.

Since as mentioned above the airplane is designed so that the propeller efficiency is maximum when the engine operates with full power, the propeller efficiency is maximized in the full-power state corresponding to the coordinate point ②. In the state corresponding to the coordinate point ②, the airplane neither accelerates nor decelerates, so that the speed of the airplane is constant. The point ②, corresponding to the state in which the airplane neither accelerates not decelerates and in which the speed of the airplane is constant, is called a balance point because the thrust and the drag of airplane balance with each other.

This balance point is set by modeling of the airframe, the propeller and the engine. That is, the force (drag) produced as resistance of air according to the speed of the airplane to act on the airframe is basically proportional to the square of the speed of the airplane and is expressed by an equation: $Dg = K\rho V^2$. If the engine is a normal aspiration (NA) engine, it is presupposed that the engine torque is proportional to the atmospheric density. With respect to the propeller, a characteristic map of a three-blade propeller "NACA5868-9" has been used. If this propeller is used and if propeller efficiency maximum points are successively plotted in the relationship of the power coefficient and the advance ratio, Cp and J form a line L6 shown in FIG. 1, such that they are in a relationship: Cp  $J^{1.66}$. Thus, in the case of the propeller "NACA5868-9", the propeller efficiency is maximum if Cp and J are on the line L6.

(2) Partial-Power Mode

The propeller efficiency has been examined by setting a suitable balance point with respect to the above-described airframe, propeller and engine when partial power is set. The results of this examination are shown in the graphs of FIGS. 2 and 3.

FIG. 2 shows a state where 75% of the maximum power is set. Since the engine power is the product of the torque and the number of revolutions as mentioned above, there are two cases of partial power setting: one in which the torque value is reduced; and one in which the number of revolutions is reduced. From this viewpoint, balance points respectively set in such two cases are marked in FIG. 2.

A point ③ represents a 75%-power balance point when the engine is in a high-rotational-frequency low-torque condition, and a point ④ represents a 75%-power balance point when the engine is in a low-rotational-frequency high-torque condition.

FIG. 3 shows a state where 50% of the maximum power is set. Similarly, a point ⑤ represents a 50%-power balance point when the engine is in a high-rotational-frequency low-torque condition, and a point ⑥ represents a 50%-power balance point when the engine is in a low-rotational-frequency high-torque condition.

These balance points ③ to ⑥ have been each identified as a point deviating from the propeller efficiency maximum line L6.

FIG. 4 shows the points ③ to ⑥ in a state of being plotted on the same graph. It has been confirmed that, as shown in FIG. 4, the propeller efficiency maximum point ② in the full-power mode is also located on the same line (Cp  $J^3$). Therefore, it is thought that, also in the partial-power mode, the propeller efficiency can be maximized with respect to any partial power if the condition corresponding to the point ② in the full-power mode can be maintained by suitably setting the torque and the number of revolutions.

(3) Relationship Between Torque and Number of Revolutions at Full-Power Point ②.

As described above, both of the power coefficient Cp and the advance ratio J are constant at the point ②. Therefore, it is thought that maximization of the propeller efficiency can be accomplished even in a partial-power mode as a result of special engine control such that both of the power coefficient Cp and the advance ratio J are constant.

The power coefficient Cp at the point ② will first be considered.

As described above, the power coefficient Cp is expressed by the following equation:

$$Cp \text{ (Power Coefficient)} = \frac{2\pi Te}{\rho N^2 D^5}$$

The atmospheric density ρ in this case is constant since the flight altitude is constant; D in this equation is uniquely determined if a predetermined propeller is specified; and 2π is a constant. Accordingly, the torque Te and $N^2$ of the number of revolutions N are in proportion. Consequently, a relational expression shown below is established between the engine torque and the number of revolutions at the point ②.

Te  $\rho N^2$

The advance ratio J at the point ② will next be considered.

A state where the advance ratio J is constant indicates balance between the thrust and the force produced as resistance of air according to the speed of the airplane to act on the airplane, i.e., the drag, as described above. It can be said that the point ② is "a point corresponding to a state where the drag and the thrust balance with each other".

A precondition for improving the fuel efficiency and the operating efficiency of the airframe and the engine of an airplane as a whole including the propeller efficiency, i.e., increasing the flight distance traveled by the airplane consuming a predetermined amount of fuel, is not that the above condition be satisfied only for an instant in the engine condition during acceleration or deceleration, but that the drag of airplane and the thrust balance each other in the course of operation.

That is, to ensure that a certain engine operating condition can be set and continuously maintained to achieve the maximum operating efficiency of the entire airplane, balance between the drag of airplane and the thrust is required.

Therefore, if the relational expression: Te  $\rho N^2$ is satisfied, it is necessary to further examine whether the point ② can be included as a balance point. For example, in a case where partial power which is ½ of the maximum power is set, it is necessary that the relationship: Te ∝ ρN² be established, and that the point ② be included as a balance point.

It is assumed here that partial power is set by setting the number of revolutions to ½ of the maximum number of revolutions.

As described above, it is first conditioned that the advance ratio J be constant. Accordingly, if the number of revolutions is reduced to ½, the airplane speed V becomes ½ according to the following equation:

$$J \text{ (Advance Ratio)} = \frac{V}{ND}$$

Then, the drag of airplane becomes ¼ according to the following equation:

$$Dg = K\rho V^2$$

The thrust will next be considered.

Te=N² is assumed by removing the atmospheric density ρ from Te=ρN² because the altitude is constant. Then the torque becomes ¼. It has been confirmed that the propeller thrust also becomes ¼ according to the following equation:

$$Th = Te \cdot Ct/(Cg \cdot D)$$

where Th is the thrust, Ct is a thrust coefficient, Cg is a torque coefficient, and D is the propeller diameter.

FIG. 7 shows equations for detailed representation of the airplane speed (1), the drag of airplane (2), the engine torque (2), and the propeller thrust (4), from which the above-described balancing relationship between the drag of airplane and the thrust has been obtained.

In the equations shown in FIG. 7, $Te_1$ and $N_1$ respectively represent the torque and the number of engine revolutions corresponding to 100% power. Also, the number of engine revolutions $N_2$ is assumed to be 1/K of $N_1$. Accordingly, $N_2 = 1/K \cdot N_1$ is presupposed.

3. Conclusions

From the above-described study, it has been confirmed that, since the above-described propeller efficiency maximum point ② is a point at which both of the power coefficient Cp and the advance ratio J are constant, maximization of the propeller efficiency can be accomplished even in a partial-power mode as a result of special engine control such that both of the power coefficient Cp and the advance ratio J are constant.

It has also been confirmed that a setting can be determined such as to maximize the propeller coefficient if the engine is controlled so as to satisfy the condition that the power coefficient Cp be constant, that is, "the torque be proportional to the square of the number of revolutions" (Te ∝ N²). Further, it has been confirmed that such control results in a state where the drag of airplane and the thrust balance with each other.

A conclusion is that, with respect to a normal aspiration engine, it is possible to maximize the propeller efficiency by controlling the engine so as to satisfy the condition that "the torque be proportional to the square of the number of revolutions" (Te ∝ N²) at the time of partial power setting.

As a result, in the case of a normal aspiration engine, the torque Te and the number of revolutions N that maximize the propeller efficiency can be determined by the above relational expression after determination of desired partial power, as shown in FIG. 8. Referring to Table 1, in the above-described case of setting 75% power, the torque is 82% and the number of revolutions is 91%. In the case of 50% power, the torque is 63% and the number of revolutions is 79%.

TABLE 1

|  | Torque | Number of revolutions |
| --- | --- | --- |
| 75% power | 82% | 91% |
| 50% power | 63% | 79% |

An engine having a turbocharger has no such change in torque as that in a normal aspiration engine due to a change in the atmospheric density, because it is boosted when the atmospheric density is reduced at a certain altitude.

Therefore, there is a need for correction by the atmospheric density ρ in the above-described relational expression of the torque and the number of revolutions in setting the propeller efficiency maximum point in a partial-power mode, and the same relational expression as the relational expression: Te ∝ ρN² of the torque and the number of revolutions obtained from the above-described formula of the power coefficient Cp applies to an engine with a turbocharger.

The relationship between the torque and the number of revolutions, considered with respect to the maximum of the propeller efficiency of an airplane on which an engine with a turbocharger is mounted, changes with respect to the atmospheric density proportional to the altitude, as shown in the graph of FIG. 5. In the graph of FIG. 5, a line L4 indicates Te ∝ ρN² on the ground, and a line L5 indicates Te ∝ ρN² at an altitude of 15000 ft.

Consequently, in the above-described example, when 75% power is to be obtained at the altitude of 15000 ft at which the atmospheric density ρ is 0.77 g/cm³, the torque is 82% and the number of revolutions is 91%, as shown in Table 2. When 75% power is to be obtained on the ground where the atmospheric density ρ is 1.225 g/cm³, the torque is 88% and the number of revolutions is 85%, as shown in Table 2.

TABLE 2

| Altitude | Torque | Number of Revolutions |
| --- | --- | --- |
| 15000 ft ① | 82% | 91% |
| On the Ground ② | 88% | 85% |

When such partial power is set, the torque is reduced, as mentioned above. Therefore, there is a possibility of the engine efficiency, i.e., the fuel efficiency of the engine, being reduced. This problem can be solved by combining lean burn control with the above-described engine control.

(3) When Airplane Drag Changes

Correction of the propeller efficiency maximum point in a case where the drag of airplane changes during a flight will next be considered.

For example, if the weight of an airplane is changed during a flight, the speed of the airplane is also changed. Correspondingly, the drag of airplane is changed according to the above equation Dg=KρV². In this case, a balance point at which the thrust and the drag of airplane balance with each other is also changed to deviate from the above-described propeller efficiency maximum point.

A case where the weight of an airplane advancing with the maximum propeller efficiency at a point ①, as shown in the graph of FIG. 6, is reduced will be considered by way of example.

If the weight of the airplane is reduced in such a situation, the speed of the airplane is increased, so that the advance ratio J represented by the axis of abscissa of the graph increases. Accordingly, the balance point ① moves toward the high-airplane-speed low-rotational-frequency side of the graph to change to a new balance point ③ while the power coefficient represented by the axis of ordinate is constant. It is apparent that the new balance point ③ after the load change is off the above-described propeller efficiency maximum line (Cp  $J^{1.66}$).

In this case, when the propeller efficiency maximum point in the above-described partial-power mode is checked, the combination of the torque and the number of revolutions is changed so as to maintain the predetermined constant power, thereby plotting a series of points forming a line indicating Cp  $J^3$.

That is, the combination of the torque and the number of revolutions is changed under the constant-power condition to extend the Cp  $J^3$ line from the balance point ③ after the load change to determine a point at which the Cp  $J^3$ line intersects the propeller efficiency maximum line (Cp  $J^{1.66}$). This point of intersection can be set as a balance point ⑤ corresponding to the maximum of the propeller efficiency after the load change.

In practice, data on the propeller efficiency maximum line (Cp  $J^{1.66}$) is stored in advance in a random access memory (RAM) provided in an electronic control unit (ECU) mounted on the airplane. With respect to the balance point ③ after the load change, the advance ratio J is computed from the airplane speed measured by a speed sensor and the number of engine revolutions, and the power coefficient is obtained from a map stored in the RAM of the ECU by referring to the number of engine revolutions.

Also in a case where the weight of the airplane is increased, the combination of the torque and the number of revolutions is changed under the constant-power condition from a balance point ② after the load increase to determine a point of intersection with the propeller efficiency maximum line (Cp  $J^{1.66}$), thereby setting a balance point ④ corresponding to the maximum of the propeller efficiency after the load change.

The combination of the torque and the number of revolutions at the intersection point can be determined.

As described above, the propeller efficiency maximum point after a load change is determined in this way, the engine torque and the number of revolutions at the propeller efficiency maximum point are determined and partial power correction of the torque and the number of revolutions is performed, thus enabling engine control with an optimal operating efficiency after the change in the load on the airplane.

The above is the principle of the present invention. The present invention can therefore be applied to either a normal aspiration engine or an engine having a turbocharger. Specific techniques for the above-described engine control will be described below with respect to preferred embodiments of the invention.

4. Control Apparatus

According to the present invention, there is also provided an apparatus for controlling a reciprocating engine with a variable-pitch propeller provided on an airplane, the apparatus comprising a throttle unit for setting the amount of air supplied to the engine, a fuel regulator for controlling the air-fuel ratio for the engine, a governor for controlling the number of revolutions of the propeller, one power control lever capable of setting desired engine power, and control means provided in association with the operating lever, the throttle unit, the fuel regulator and the governor, the control means having an air-fuel ratio map, a throttle opening map and an engine revolution map formed so as to enable setting of an engine torque Te and a number of engine revolutions N such that a relationship expressed by Te  $N^2$ is established, the control means being capable of outputting, to the throttle unit, the fuel regulator and the governor, control values by comparing information about partial power selected by the operating lever with each of the maps, the control values being such that the propeller efficiency is maximized when predetermined partial power is set.

The above-described airplane engine control apparatus also has a sensor for measuring the opening angle of the operating lever. The above-described control means includes means for outputting, to the throttle unit, the fuel regulator and the governor, control values by comparing each of the maps and partial power information including the opening angle value of the operating lever measured with the sensor, the control values being such that the propeller efficiency is maximized when predetermined partial power is set.

The above-described airplane engine control apparatus also has a sensor for measuring the number of engine revolutions. The above-described control means includes means for outputting, to the throttle unit, the fuel regulator and the governor, control-values by comparing each of the maps and partial power information including the number of engine revolutions measured with the sensor, the control values being such that the propeller efficiency is maximized when predetermined partial power is set.

According to the present invention, there is further provided an apparatus for controlling a reciprocating engine with a variable-pitch propeller and a turbocharger provided on an airplane, the apparatus comprising a throttle unit for setting the amount of air supplied to the engine, a fuel regulator for controlling the air-fuel ratio for the engine, a governor for controlling the number of revolutions of the propeller, a boost pressure setting device capable of controlling the boost pressure of the turbocharger, one power control lever capable of setting desired engine power, measuring means capable of measuring the opening angle of the power control lever, and control means provided in association with the operating lever, the throttle unit, the fuel regulator and the governor, the control means having an air-fuel ratio map, a throttle opening map, an engine revolution map and a boost pressure map set so as to enable setting of an engine torque Te and a number of engine revolutions N such that a relationship expressed by Te  $\rho N^2$ is established, the control means being capable of outputting, to the throttle unit, the fuel regulator and the governor, control values by comparing each of the maps and the opening angle value of the operating lever measured by the operating lever measuring means, the control values being such that the propeller efficiency is maximized when predetermined partial power selected by the operating lever is set.

An atmospheric density compensation mechanism is provided between the power control lever and the throttle unit, and the atmospheric density compensation mechanism may be constituted of a bellows mechanism capable of adjusting the opening angle value of the operating lever in accordance with the atmospheric density.

The atmospheric density compensation mechanism may have an air pressure sensor capable of measuring atmospheric pressure, a throttle actuator capable of adjusting the throttle opening, and control means capable of controlling the amount of drive of the throttle actuator on the basis of the value of atmospheric pressure measured with the air pressure sensor, and may control the opening angle of the operating lever in accordance with the atmospheric density.

The configuration and specific components of airplane engine control apparatuses in accordance with the present invention will be described below with respect to embodiments of the invention.

BRIEF DESCRIPTION OF THE DRAWINGS

FIG. 7 shows equations for calculations of the airplane speed, the drag of airplane, the engine torque and the propeller efficiency, which have been used to demonstrate that the propeller efficiency maximum point in FIG. 4 is a balance point at which the drag of airplane and the thrust balance with each other.

DESCRIPTION OF THE PREFERRED EMBODIMENTS

An airplane control method of the present invention will be described in detail with respect to specific control processes, and the configuration and specific components of airplane engine control apparatuses used according to the airplane control method of the present invention will also be described together with the method.

FIGS. 8 through 12 show a first embodiment of the present invention in which an airplane engine control method and apparatus in accordance with the present invention are applied to a normal aspiration type of gasoline reciprocating engine, and which is the most essential basic embodiment of the present invention.

In the airplane engine control apparatus and method of this embodiment, the above-described partial power setting control is performed through air-fuel ratio control, throttle opening control and governor revolutions control in such a manner that a wide-open throttle condition is maintained and control for a leaned setting of the air-fuel ratio in an engine is performed, thereby performing control from a full-power condition to a partial-power condition corresponding to a lean burn limit point.

Figure 8:
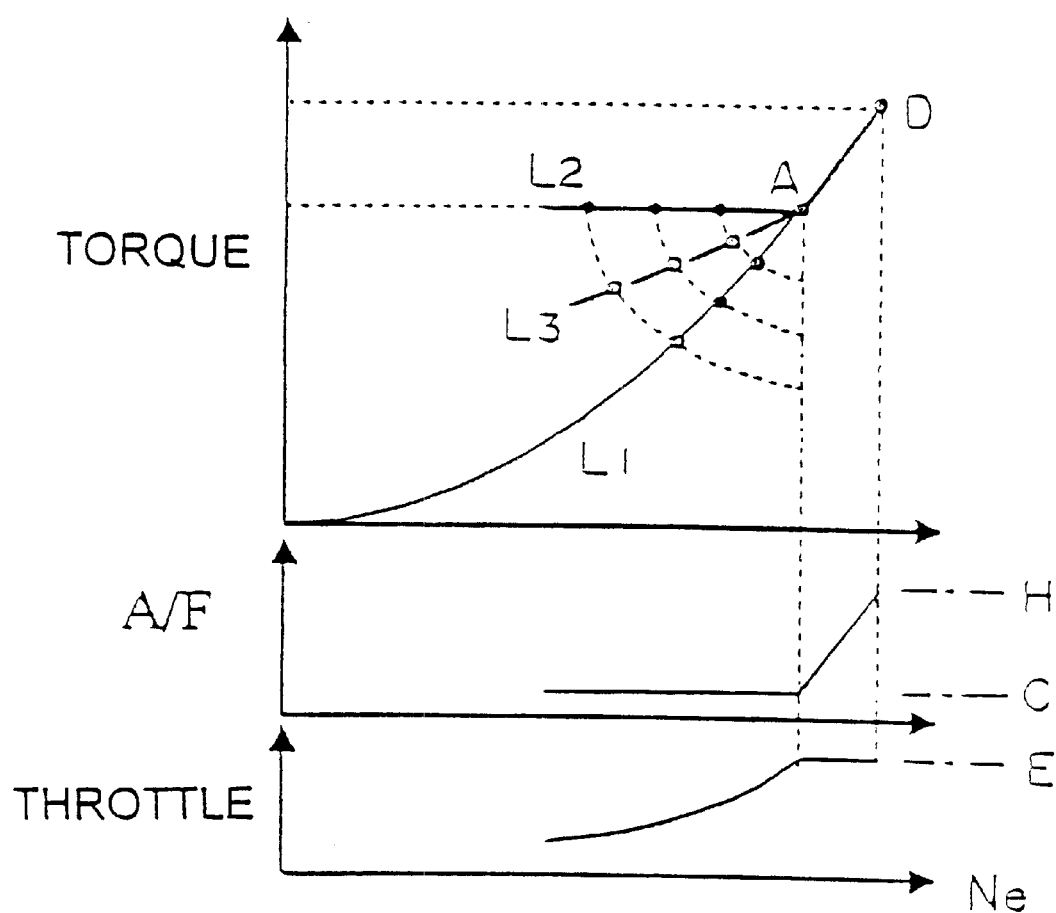
FIG. 8 is a graph showing the relationship between each of torque Te, air-fuel ratio A/F, and throttle opening represented by the axis of ordinates, and the number of governor revolutions Ne represented by the axis of abscissa in a case where partial power is set by control for a leaned setting of the air-fuel ratio from a full-power condition along a propeller efficiency maximum line in a normal-aspiration gasoline reciprocating engine according to the airplane engine control method in one embodiment of the present invention.

The graph of FIG. 8 shows the basic concept of control according to this embodiment.

The graph of FIG. 8 comprises composite coordinate systems in which the axes of ordinates respectively represent the torque Te, the air-fuel ratio A/F and the throttle opening, and the axis of abscissa represents the number of governor revolutions Ne.

In this graph, a line L1 indicating Te  $N^2$ is formed in the graph of the torque and the number of engine revolutions. The upper end of this line L1 is a full-power (100% power) point.

In this embodiment, a wide-open throttle (WOT) condition is maintained and control for a leaned setting of the air-fuel ratio in the engine is simultaneously performed, thereby obtaining partial power. In the engine according to this embodiment, the air-fuel ratio in the 100%-power mode is set to an air-fuel ratio value of 12 at a rich condition point H, and is reduced to an air-fuel ratio value of 16 at a lean burn lower limit C. Lean control of the air-fuel ratio is performed under this condition to obtain partial power. When a point A corresponding to the lean burn lower limit point C is reached, 78% partial power is obtained.

Since point A indicating the relationship between the torque and the number of revolutions of the engine corresponding to lean burn lower limit point C is a lean burn limit point, the fuel efficiency of the engine is maximized at point A. Also, since point A is located on line L1 (Te  $N^2$) along which the maximum of the propeller efficiency is maintained, the operating efficiency of the airframe and the engine as a whole is maximized at point A.

In this embodiment, therefore, the above-described engine control condition at point A is maintained, that is, the throttle is set in the WOT state; air-fuel ratio control at the lean burn limit point is performed; and the corresponding number of governor revolutions is set, thus setting and maintaining partial power. In this manner, the condition corresponding to the optimal operating efficiency of the airframe and the engine of the airplane as a whole, including the engine fuel efficiency and the propeller efficiency, can be set.

To obtain partial power smaller than the above-mentioned 78% partial power, the fuel/ratio of the engine is controlled by reducing the throttle opening because lean-mixture control cannot be performed below the above-mentioned limit. In this case, if the engine is controlled by maintaining the throttle in the wide-open state indicated by E (WOT) and by performing air-fuel ratio control so as to maintain the engine condition at the lean burn limit point (as indicated by line L2 in the graph of FIG. 8), it is possible to say that the fuel efficiency of the engine is favorable considering the control conditions that the throttle be in the WOT state; the air-fuel ratio control be in the lean burn mode; and the torque be constant. However, the control point deviates largely from the above-described propeller efficiency maximum line, so that the resulting operating efficiency of the airframe and the engine as a whole is not good.

Consequently, to obtain partial power smaller than the above-mentioned 78% partial power, the toque and the number of revolutions are controlled along a line L3 formed at an intermediate position between the above-described propeller efficiency maximum line L1 (Te $\propto$ N$^2$) and the above-described WOT-lean line L2.

Figure 9:
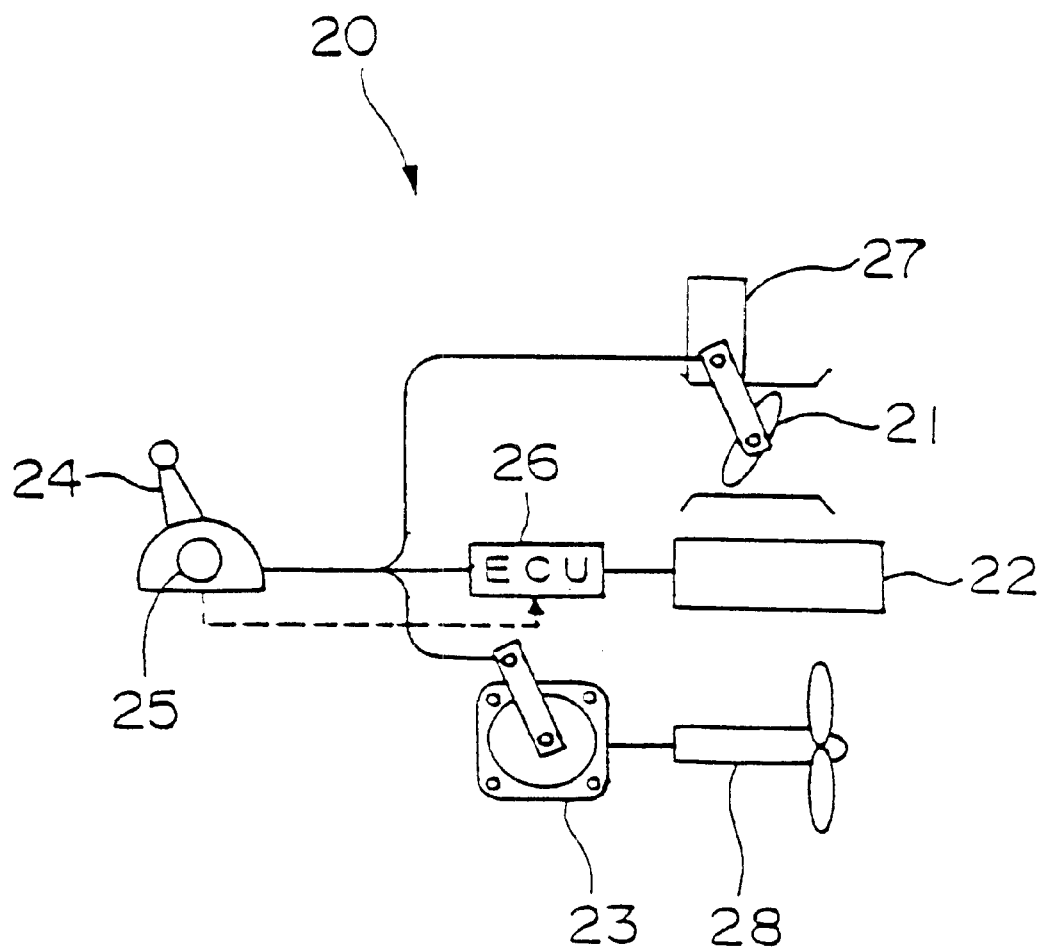
FIG. 9 is a diagram schematically showing a control apparatus for controlling a normal-aspiration gasoline reciprocating engine according to the airplane engine control method in one embodiment of the present invention in a case where each of control objects is controlled with respect to the opening angle of a power control lever.

FIG. 9 schematically shows the configuration of a control apparatus 20 for performing single-lever control of a normal aspiration type gasoline reciprocating engine in accordance with the above-described airplane engine control method of this embodiment.

In the engine control apparatus 20 of this embodiment, a throttle 21, a fuel regulator 22 and a governor 23 are controlled simultaneously with each other by one power control lever 24. A component indicated by 28 in the figure is a propeller.

That is, the power control lever 24 is connected to the throttle 21 by a nonlinear link mechanism to operate the same. An example of the "nonlinear link mechanism", according to this embodiment, is constituted of a suitable throttle actuator 27 for driving the throttle 21 and an electronic control unit (ECU) 26 which controls the throttle actuator 27.

The power control lever 24 and the fuel regulator 22 are connected through the ECU 26. A lever opening angle sensor 25 is attached to the power control lever 24. The opening angle value of the power control lever 24 measured with the lever angle sensor 25 is supplied to the ECU 26, and the ECU 26 reads the power control lever opening angle value. The ECU 26 has prepared maps of power control lever opening angle values and air-fuel ratio values. The ECU 26 is arranged to select, from the maps, an air-fuel ratio corresponding to the read power control lever opening angle value, and to output the predetermined air-fuel ratio value to the fuel regulator 22. The power control lever 24 and the governor 23 are connected by an ordinary link mechanism.

The embodiment has been described with respect to the case where the power control lever 24 and the throttle 21 are connected by a nonlinear link mechanism. However, the link means for this connection in this embodiment is not limited to the nonlinear link mechanism and a linear link mechanism may be used instead.

An engine control process in which partial power is set by the airplane engine control method according to this embodiment and which is related to the above-described control apparatus 20 will now be described with reference to the control flowchart of FIG. 10.

Figure 10:
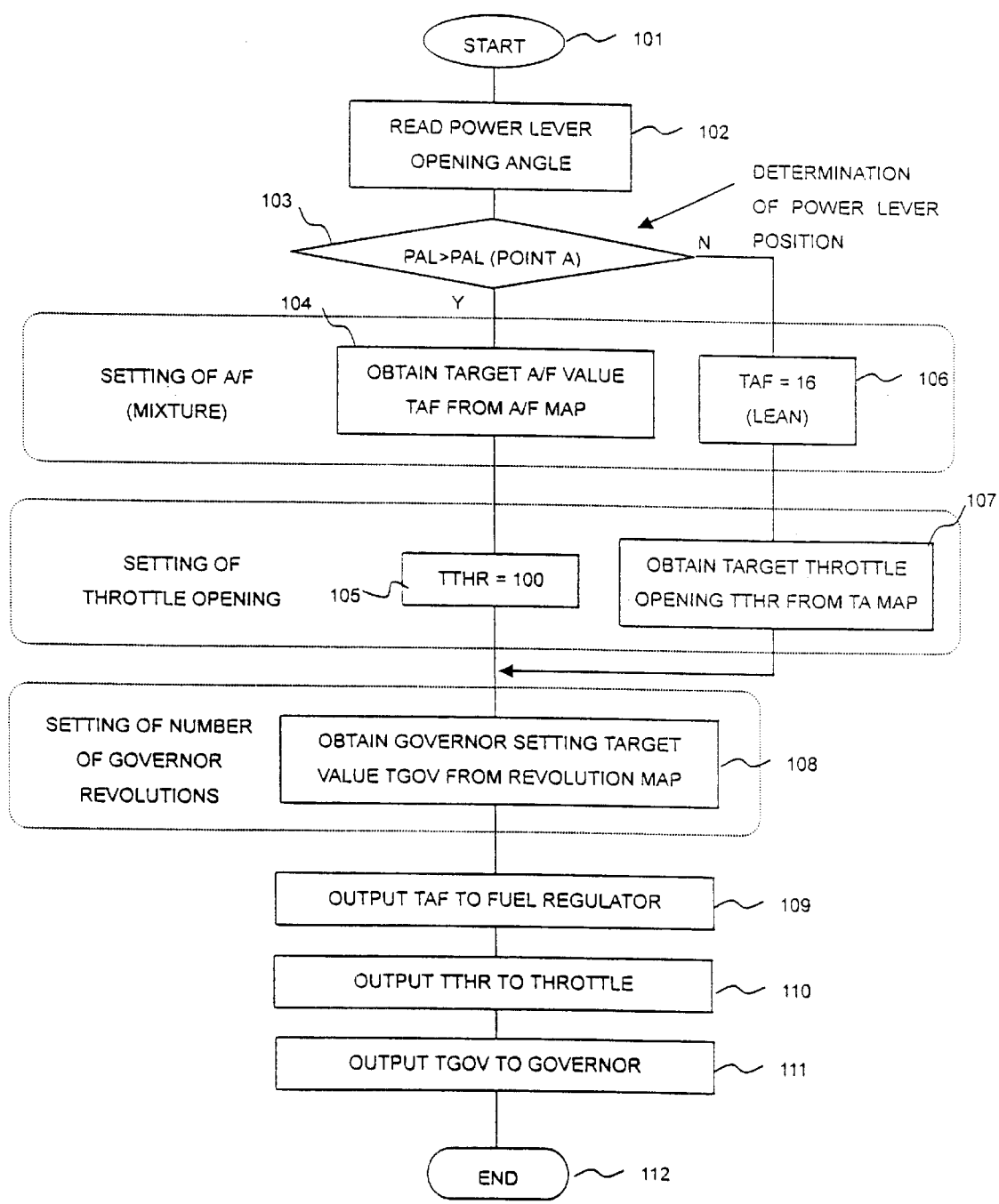
FIG. 10 is a flowchart of an engine control process in which partial power is set in a normal-aspiration gasoline reciprocating engine with respect to the opening angle of a power control lever according to the airplane engine control method in one embodiment of the present invention.

Referring to FIG. 10, after a start of control in step S101, the angle of the power control lever 24 operated by a pilot for the purpose of setting partial power is read by the lever opening angle sensor 25 in step S102, and the ECU 26 stores the numerical value of the angle of the power control lever 24.

In step S103, a determination is made as to whether the angle PAL of the power control lever 24 read to the ECU is larger than the power control lever angle corresponding to point A in FIG. 8, that is, whether the partial power selected by the pilot is larger than the partial power corresponding to point A corresponding to the lean burn limit.

If it is determined in step S103 that the present angle PAL of the power control lever 24 is larger than the power control lever angle PAL (point A) corresponding to the point A, and that the partial power selected by the pilot is larger than the partial power at the point A, a target air-fuel ratio value TAF is obtained in step S104 from the prepared air-fuel ratio control map in the ECU 26.

In this case, the opening of the throttle 21 is set in step S105. In this embodiment, since the control apparatus is arranged to obtain partial power by performing control for a leaned setting of the air-fuel ratio in the engine while maintaining the wide-open throttle (WOT) condition, the value of target throttle opening TTHR is set to 100 (wide-open value).

If it is determined in step S103 that the present angle PAL of the power control lever 24 is not larger than the power control lever angle PAL (point A) corresponding to point A, and that the partial power selected by the pilot is not larger than the partial power at point A, the target air-fuel ratio value TAF is set, in the fuel regulator 21 controlled by the CPU 26, in step S106, to the lean burn limit value of 16 set in the engine in this embodiment.

In this case, in step S107, a target throttle opening TTHR is obtained from a target air-fuel ratio TA map prepared by assuming the throttle opening corresponding to the angle of the power control lever 24.

In step S108, the number of revolutions of the governor 23 is set. In this embodiment, the power control lever 24 and the governor 23 are connected by a link mechanism, and a target value TGOV for setting the governor 23 is obtained from a prepared revolution map by referring to the angle of the power control lever 24.

Thereafter, in step S109, the target air-fuel ratio TAF is output to the fuel regulator 22. In step S110, the target throttle opening TTHR is output to the throttle actuator 27. In step S111, the target number of governor revolutions TGOV is output to the governor 23. The control process ends in step S112.

Thus, the target air-fuel ratio TAF, the target throttle opening TTHR, and the target number of governor revolutions TGOV are output to the fuel regulator 22, the throttle 21 and the governor 23, respectively. Thus, air-fuel ratio control and engine control based on the opening of the throttle 21 and the number of engine revolutions are performed so as to set a propeller efficiency maximum condition at a predetermined partial power.

Engine control is performed in the above described manner to set a propeller efficiency maximum condition at a predetermined partial power. Therefore, the operation in the partial-power mode can be performed while maintaining a such control condition that the operating efficiency of the airframe and the engine as a whole, including the propeller efficiency as well as the engine fuel efficiency, is maximized.

Figure 11:
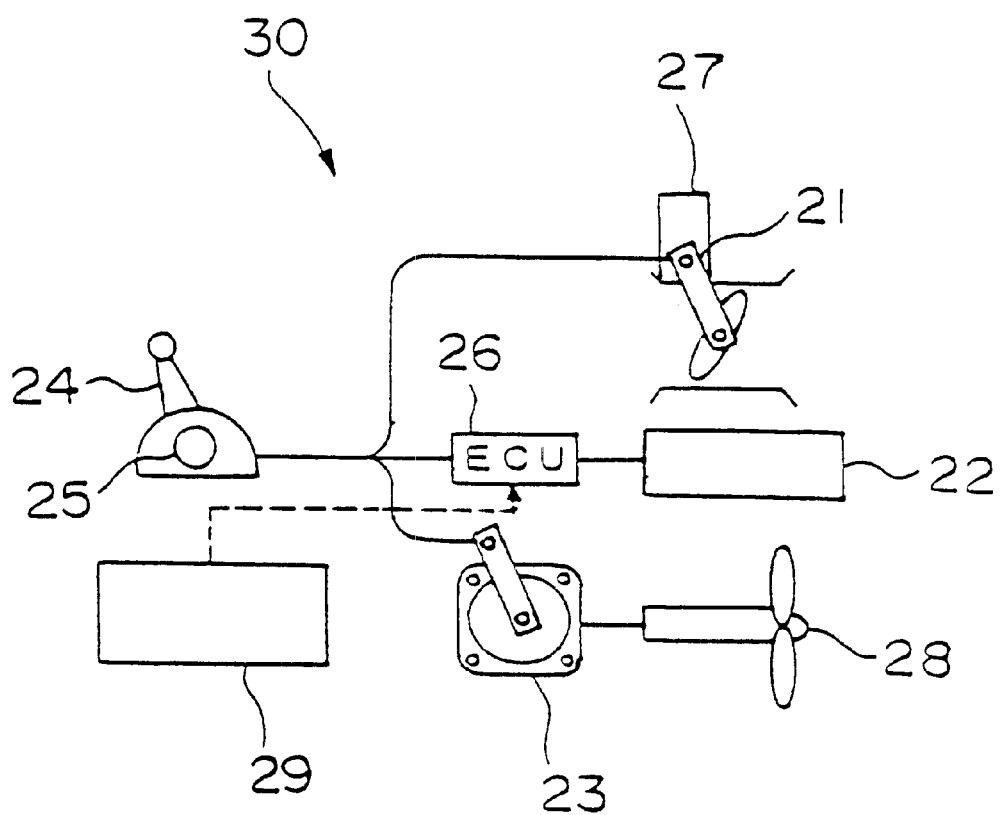
FIG. 11 is a diagram schematically showing a control apparatus for controlling a normal-aspiration gasoline reciprocating engine according to the airplane engine control method in one embodiment of the present invention in a case where each of control objects is controlled with respect to the number of engine revolutions.

FIG. 11 shows a second embodiment of the present invention in which the airplane engine control method of the present invention is applied to a normal aspiration type of gasoline reciprocating engine.

An engine control apparatus 30 of this embodiment also controls a normal aspiration type of gasoline reciprocating engine, as does the control apparatus 20 of the first embodiment. However, the control apparatus 30 differs from the control apparatus 20 of the first embodiment in that the number of engine revolutions is measured with an engine revolution sensor 29, and scheduling is performed on the basis of the measured value.

That is, in this embodiment, the engine revolution sensor 29 measures the number of engine revolutions, the ECU 26 reads the measured value, and the fuel regulator 22 is controlled on the basis of the measured value. In other respects, the configuration and components of the control apparatus 30 are the same as those of the control apparatus 20 of the first embodiment.

Figure 12:
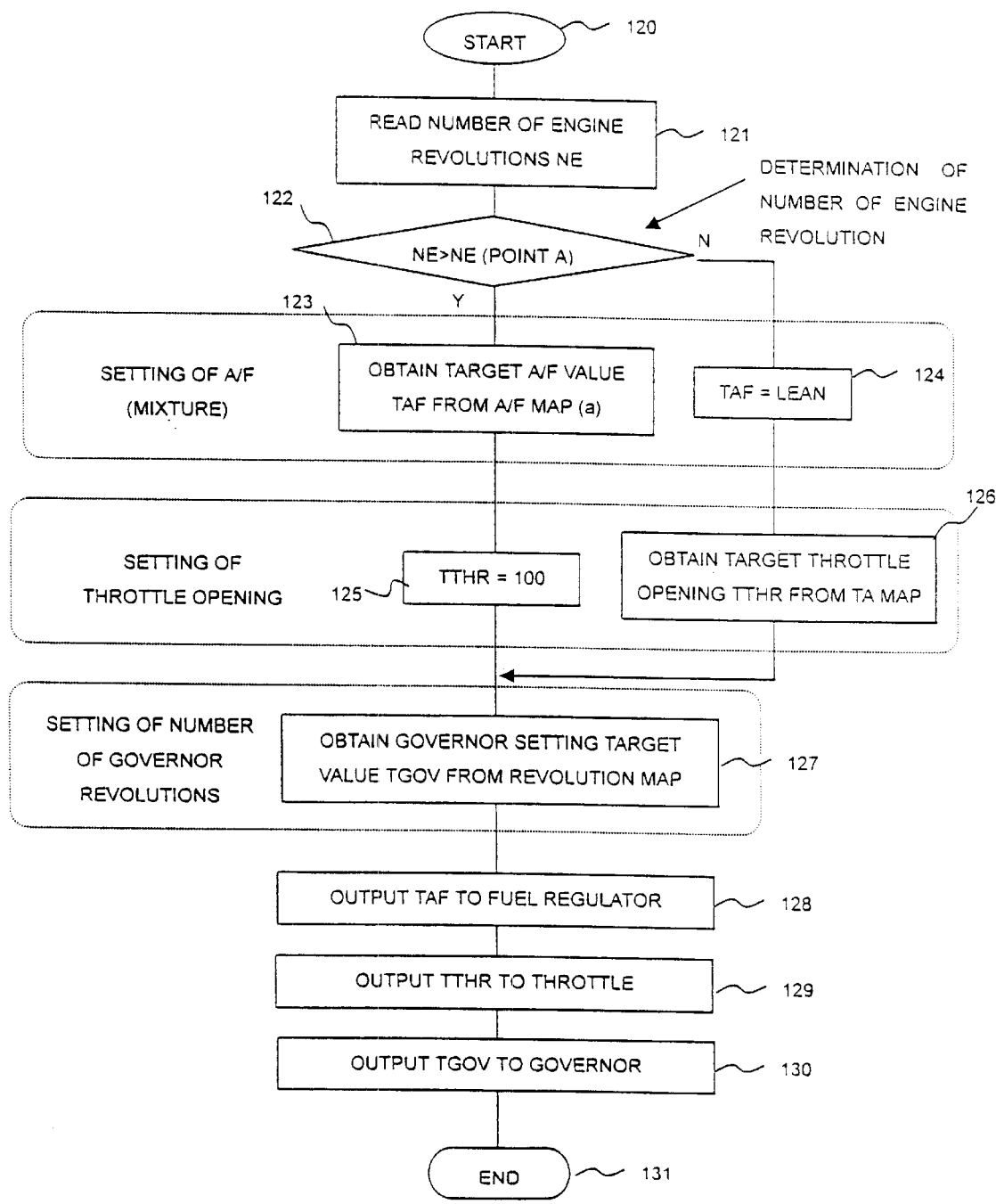
FIG. 12 is a flowchart of an engine control process in which partial power is set in a normal-aspiration gasoline reciprocating engine with respect to the number of engine revolutions according to the airplane engine control method in one embodiment of the present invention.

An control process performed by the engine control apparatus 30 of this embodiment will be described with reference to the flowchart of FIG. 12.

After a start of the engine control in step S120, the engine revolution sensor 29 measures the number of engine revolutions when the engine operates with partial power selected by a pilot operating the power control lever 24. In step S121, the ECU 26 connected to the engine revolution sensor 29 reads the number of engine revolutions NE measured.

In step S122, the number of engine revolutions NE at the partial power selected by the pilot and the number of engine revolutions NE at lean burn limit point A are compared.

If it is determined in step S121 that the number of engine revolutions NE measured by the engine revolution sensor 29 is larger than the number of engine revolutions NE at the lean burn limit point, a target air-fuel ratio value TAF is obtained in step S123 from the prepared air-fuel ratio control map in the ECU 26.

In this case, the opening degree of the throttle 21 is set in step S125. In this embodiment, since the control apparatus is arranged to obtain partial power by performing control for a leaned setting of the air-fuel ratio in the engine while maintaining the wide-open throttle (WOT) condition, the value of target throttle opening TTHR is set to 100 (wide-open value).

If it is determined in step S122 that the number of engine revolutions NE at the partial power selected by the pilot is not larger than the number of engine revolutions at the engine power corresponding to point A, the ECU 26 determines the target air-fuel ratio value TAF=LEAN as a lean burn limit value in the engine of this embodiment.

In this case, in step S126, a target throttle opening TTHR is obtained from a target air-fuel ratio TA map prepared with respect to the relationship between air-fuel ratio control and the throttle opening corresponding to the angle of the power control lever 24.

Thereafter, in step S127, the number of revolutions of the governor 23 is set. In this embodiment, the power control lever 24 and the governor 23 are connected by a link mechanism, and a target value TGOV for setting the governor 23 is obtained from a revolution map by referring to the angle of the power control lever 24, as is that in the first embodiment.

In step S128, the target air-fuel ratio TAF is output to the fuel regulator 22. In step S129, the target throttle opening TTHR is output to the throttle 21. In step S130, the target number of governor revolutions TGOV is output to the governor 23. The partial power setting control ends in step S131.

Thus, in the above-described first and second embodiments, partial power can be set while maintaining such a control condition that the operating efficiency of the airframe and the engine as a whole, including the propeller efficiency, is maximized. This partial power setting can be accomplished by providing a simple arrangement without a means for atmospheric density compensation, such as one required for an engine with a turbocharger described below, because the engine torque of the normal aspiration reciprocating engine is proportional to the atmospheric density.

Consequently, according to the above-described embodiments, a control apparatus manufactured at a limited cost can be easily operated to perform a partial power setting process in which a control condition is maintained such that the operating efficiency of the airframe and the engine as a whole, including the propeller efficiency as well as the engine fuel efficiency, is maximized.

FIGS. 13 through 22 show other embodiments of the present invention represented by other examples of the airplane engine control method and apparatus in accordance with the present invention. In the other embodiments, a gasoline reciprocating engine is equipped with a turbocharger.

If an airplane engine is equipped with a turbocharger, the engine torque is not reduced even when the altitude of the airplane becomes high and the atmospheric density becomes lower, as described above. Therefore, control of an engine with a turbocharger, unlike control of a normal aspiration reciprocating engine, requires compensation with respect to the atmospheric density in the relational expression of the torque and the number of revolutions from the equation of the power coefficient, as described above. The resulting relational expression is as follows:

$$Te \propto \rho N^2$$

In this case, as shown in FIGS. 13(a) and 13(b), different lines are formed with respect to a condition at a certain altitude and a condition on the ground as a line along which the relationship of the torque and the number of revolutions for setting the maximum propeller efficiency is established. FIG. 13(a) shows a propeller efficiency maximum line L5 indicating $Te \propto \rho N^2$ at a certain altitude, and FIG. 13(b) shows a propeller efficiency maximum line L4 indicating $Te \propto \rho N^2$ on the ground, in contrast with the line L5.

On the ground, as shown in FIG. 13(b), the atmospheric density is high and the value of $\rho$ in the above relational expression is large. Accordingly, a point D of intersection of the $Te \propto \rho N^2$ line and 100%-torque line L6 is shifted in the direction of reduction in the number of engine revolutions relative to line L5 for scheduling at a certain altitude, shown as a broken line in FIG. 13(b), so that the number of revolutions at which the engine outputs the maximum power (100% power) is reduced in comparison with the corresponding number of revolutions at the altitude. Thus, point D of intersection of the $Te \propto \rho N^2$ line and the 100%-torque line L6 is determined as a function of the atmospheric density.

Also, the engine with a turbocharger, unlike a normal aspiration reciprocating engine, can be controlled through the boost pressure, which is an additional engine power control factor other than the air-fuel ratio, the number of engine revolutions and the throttle opening of a normal aspiration engine.

In one embodiment of the present invention, therefore, a possible process of obtaining predetermined partial power while optimizing the propeller efficiency is such that the boost pressure is first reduced to a predetermined level to reduce the engine power to predetermined point B or B' and, thereafter, control for a leaned setting of the air-fuel ratio is performed to further reduce the engine power to point A or A' corresponding to the lean burn limit.

Thus, in this embodiment, the power is reduced from the 100% power point to point A or A' corresponding to the lean burn limit along Te $\rho N^2$ line L4 or L5 to set partial power. At point A or A' set as described above, an operating condition is maintained such that the efficiency of the airframe and an engine as a whole is optimized in terms of both the propeller efficiency and the engine fuel efficiency.

As is apparent from FIGS. 13(a) and 13(b), since the atmospheric density $\rho$ is higher on the ground, the increase in the rate at which propeller efficiency optimum line L4 rises is correspondingly higher than the rate at which line L5 rises.

On the ground, therefore, when predetermined partial power is set, the reduction in the boost pressure and the reduction in the air-fuel ratio can be set to larger values in comparison with partial power setting at a certain altitude.

Figure 14:
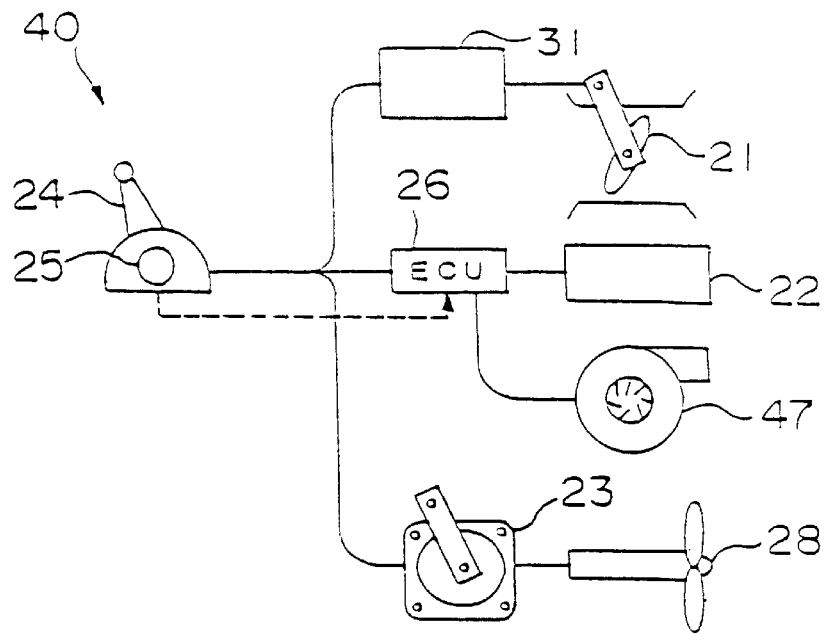
FIG. 14 is a diagram schematically showing a control apparatus for controlling a gasoline reciprocating engine with a turbocharger according to the airplane engine control method in one embodiment of the present invention in a case where an atmospheric density compensation mechanism is used.
Figure 15:
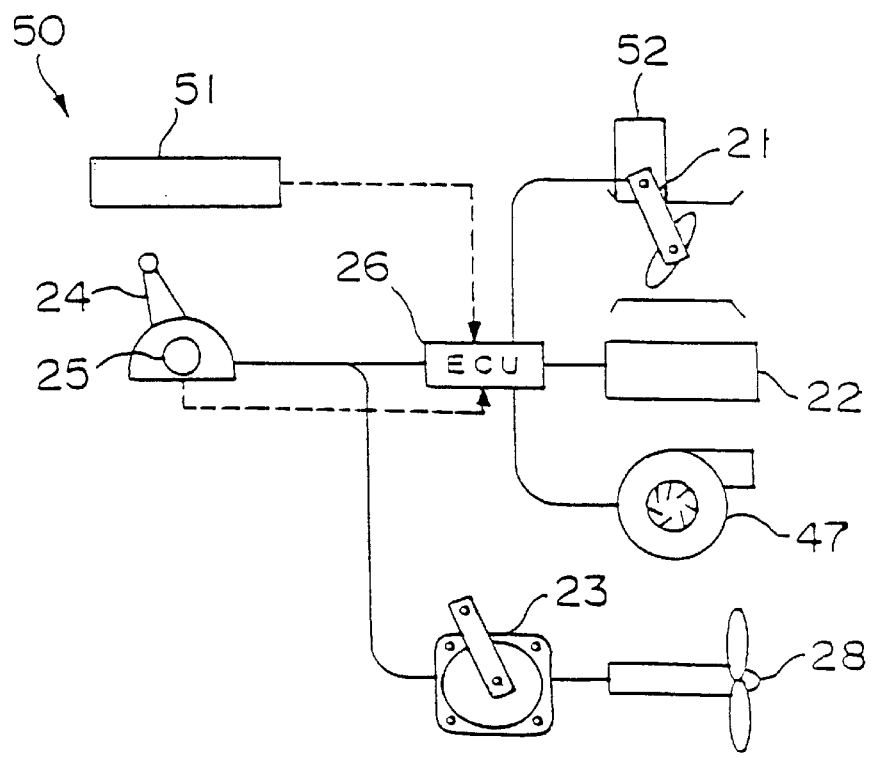
FIG. 15 is a diagram schematically showing a control apparatus for controlling a gasoline reciprocating engine with a turbocharger according to the airplane engine control method in one embodiment of the present invention in a case where atmospheric density compensation is performed by using an electrical type air pressure sensor.

FIGS. 14 and 15 show examples of control systems 40 and 50 for airplane engines with turbochargers according to this embodiment.

FIG. 14 shows one embodiment of the present invention represented by the control system 40 for controlling an airplane engine with a turbocharger. The control system 40 has basically the same configuration as the above-described control system 20 for a normal aspiration type gasoline reciprocating engine shown in FIG. 9. The control system 40 differs from the control system 20 in that a turbocharger boost pressure setting device 47 controlled by the ECU 26 is provided, and that an atmospheric density compensation mechanism 31 is provided between the power control lever 24 and the throttle 21.

Figure 16:
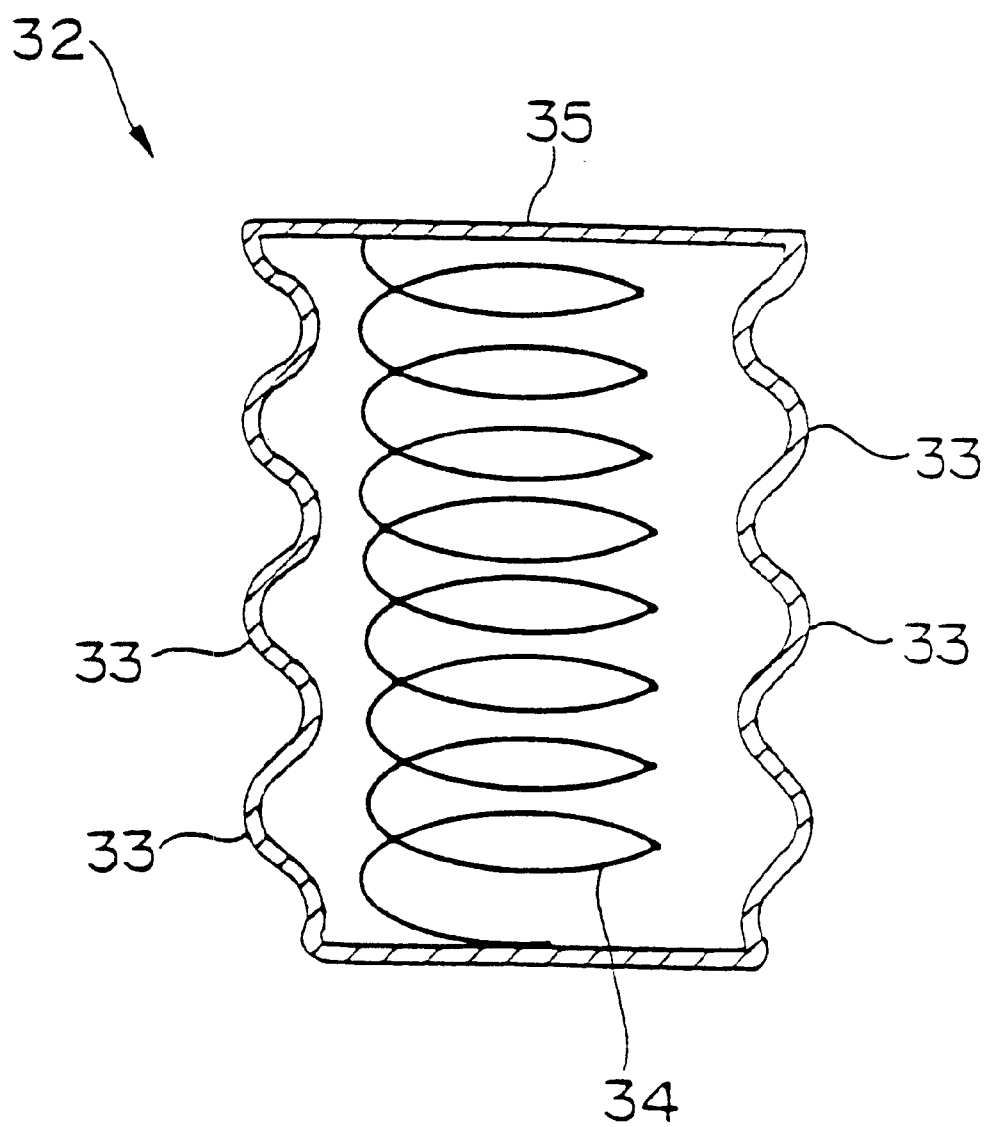
FIG. 16 is a diagram schematically showing a bellows device used in the atmospheric density compensation mechanism used in the control apparatus shown in FIG. 14.

In this embodiment, the atmospheric density compensation mechanism 31 is constituted of a bellows 32. As schematically shown in FIG. 16, the bellows 32 is basically a bellows-like metallic tube formed in an airtight manner. The bellows 32 has ribs 33 formed by being suitably bulged radially inwardly, and an internal spring 34 set about its center axis. The enclosed space in the bellows 32 is evacuated. The spring 34 has a spring constant set in proportion to a predetermined atmospheric pressure level. If the atmospheric pressure changes to apply to the bellows 32 a pressure larger than the force of the spring 34 determined by the spring constant of the same, the bellows 32 contracts along its axial direction against the urging force of the spring 34. When a pressure smaller than the force determined by the spring constant of the spring 34 is applied, the bellows 32 expands along its axial direction by the urging force of the spring 34. In this embodiment, the bellows 32 contacts under the air pressure on the ground, and expands under a low pressure at a substantially high altitude.

Figure 17:
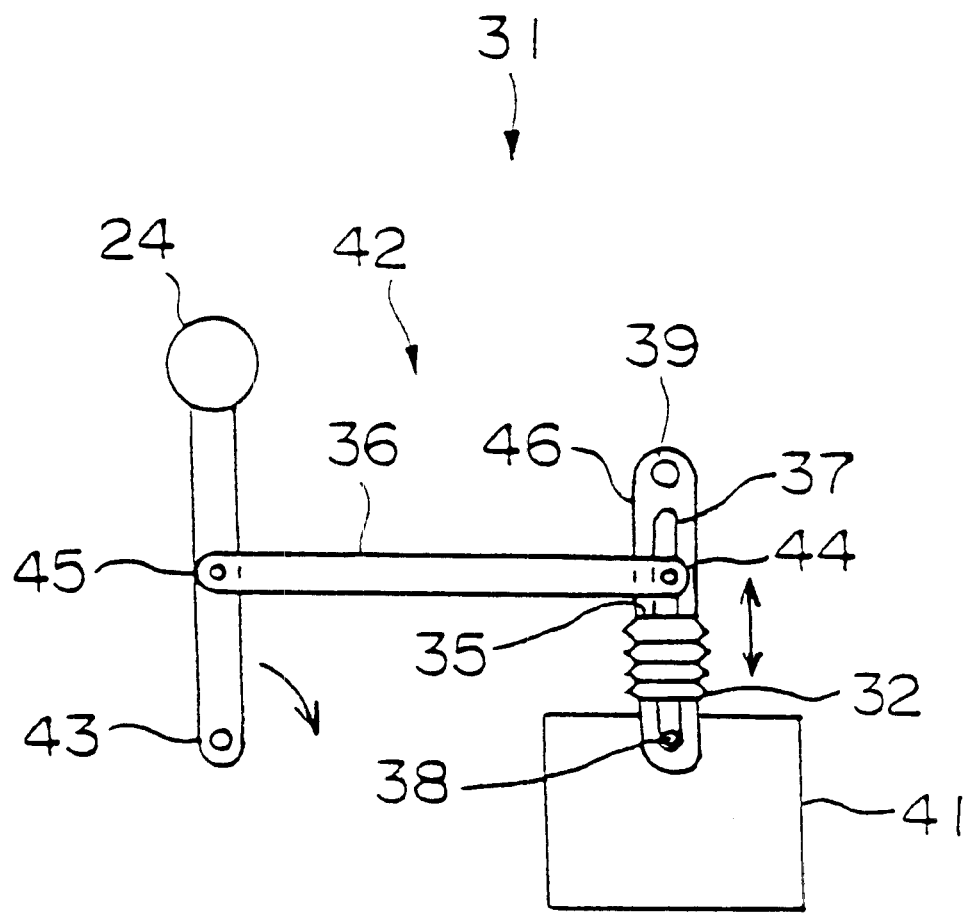
FIG. 17 is a diagram schematically showing the atmospheric density compensation mechanism used in the control apparatus shown in FIG. 14 to perform engine control through a link mechanism incorporating the bellows device.

As shown in FIG. 17, to form the atmospheric density compensation mechanism 31 between the power control lever 24 and the throttle 21, a link mechanism 42 is constructed between the power control lever 24 and a throttle unit 41, and the bellows 32 is mounted on a throttle lever 46.

That is, the power control lever 24 is formed so as to be swingable on its end portion 43, and an elongated hole 37 is formed in the throttle lever 46 so that its longitudinal axis coincides with that of the throttle lever 46. The throttle lever 46 has, at its one end, an end portion 38 coupled by a suitable means to a throttle valve (not shown) provided in the throttle unit 41 so as to be able to operate the throttle valve, and a free end portion 39 at the other end.

A link bar 36 is axially supported at its opposite ends on an intermediate portion of the power control lever 24 and the throttle lever 46 of the throttle unit 41. One end portion 45 of the link bar 36 is axially supported on the power control lever 24 so as to be swingable relative to the power control lever 24 but not movable relative to the same in any other way. A connecting portion 44 of the link bar 36 at the other end is connected to the throttle lever 46 so as to be movable in the elongated hole 37.

The above-described bellows 32 is mounted on the throttle lever 46 along the longitudinal direction of the same. One end of the bellows 32 is fixed to the end portion 38 of the throttle lever 46 while the other end portion 38 of the bellows 32 is fixed to the connecting portion 44 for connection between the link bar 36 and the throttle lever 46. An end portion 35 of the bellows 32 on the connecting portion 44 side forms an air pressure receiving surface.

The operation of the thus-constructed atmospheric density compensation mechanism 31 will be described.

When a pilot operates the power control lever 24 in the control system using the atmospheric density compensation mechanism 31, the throttle lever 46 operates by following the power control lever 24 through the link bar 36. If the airplane is flying at a high altitude, and if the pilot sets predetermined partial power when the atmospheric density is sufficiently low, the atmospheric pressure acting on the end portion 35 of the bellows 32 is smaller than the force of the spring 34 determined by the spring constant of the spring 34 provided in the bellows 32. Under this condition, the bellows 32 expands by the urging force of the spring 34. The connecting portion 44 for connection between the link bar 36 and the throttle lever 46 is thereby moved toward the free end portion 39 of the throttle lever 46. As a result, the distance between the connecting portion 44 and the end portion 38 on which the throttle lever 46 moves swingably is increased.

When the airplane is flying at a high altitude, the atmospheric density $\rho$ is low and a small compensation value suffices. Therefore, the opening angle of the power control lever 24 on the end portion 43 is set to a smaller value.

If the airplane is flying at a small height near the ground, and if the pilot sets predetermined partial power when the atmospheric density is sufficiently high, the atmospheric pressure acting on the end portion 35 of the bellows 32 formed as an air pressure receiving surface is larger than the force of the spring 34 determined by the spring constant of the spring 34 provided in the bellows 32 . Under this condition, the bellows 32 contracts against the urging force of the spring 34. The connecting portion 44 for connection between the link bar 36 and the throttle lever 46 is thereby moved toward the end portion 38 of the throttle lever 46.

As a result, the distance between the connecting portion 44 and the end portion 38 on which the throttle lever 46 moves swingably, and through which the throttle valve is operated, is reduced, so that the opening angle of the power control lever 24 on the end portion 43 is increased.

Consequently, during a flight near the ground, such as one relating to FIG. 13(b), the opening angle of the power control lever 24 can be set so as to be larger than the opening angle set during a flight at a high altitude, such as one relating to FIG. 13(a), thereby increasing the range of control for leaned settings of the air-fuel ratio.

As shown in FIG. 14, the control system 40 of this embodiment is arranged so that the fuel regulator 22 and the turbocharger boost pressure setting device 47 can be controlled by the ECU 26.

Therefore, when predetermined partial power is selected by the power control lever 24 in the control system 40 of this embodiment, the opening angle sensor 25 measures the opening angle of the power control lever 24, and the ECU 26 reads the measured value from the power control lever opening angle sensor 25. The ECU 26 is provided with a map of power control lever opening angle values, air-fuel ratio values and boost pressure values. The ECU 26 selects, from this map, an air-fuel ratio and a boost pressure value corresponding to the read power control lever opening angle value, instructs the fuel regulator 22 of a predetermined air-fuel ratio, and instructs the turbocharger boost pressure setting device 47 of a corresponding boost pressure.

FIG. 15 shows one embodiment of the present invention in which a reciprocating gasoline engine with a turbocharger is controlled by a system in which atmospheric density compensation is performed by using an air pressure sensor 51.

That is, the control system 50 for controlling an airplane engine with a turbocharger according to this embodiment has basically the same configuration as the control system 40 of the above-described embodiment, but differs from the system 40 in that the air pressure sensor 51 operating electrically is provided instead of the above-described atmospheric density compensation mechanism 31, and that atmospheric density compensation is performed by the air pressure sensor 51 and a throttle actuator 52 driven on the basis of a signal from the air pressure sensor 51.

In the control system 50 of this embodiment, therefore, the air pressure sensor 51 measures the atmospheric pressure at the altitude at which the airplane flies, and the ECU 26 reads the atmospheric pressure value thereby measured. The ECU 26 has a suitable map of atmospheric pressure values and throttle opening values, determines from this map a throttle opening value corresponding to the read atmospheric pressure value, and outputs the determined throttle opening value to the throttle actuator 52. The throttle actuator 52 operates the throttle 21 so as to set the opening according to the supplied throttle opening value corresponding to the atmospheric pressure value, thus performing suitable atmospheric density compensation.

Figure 18:
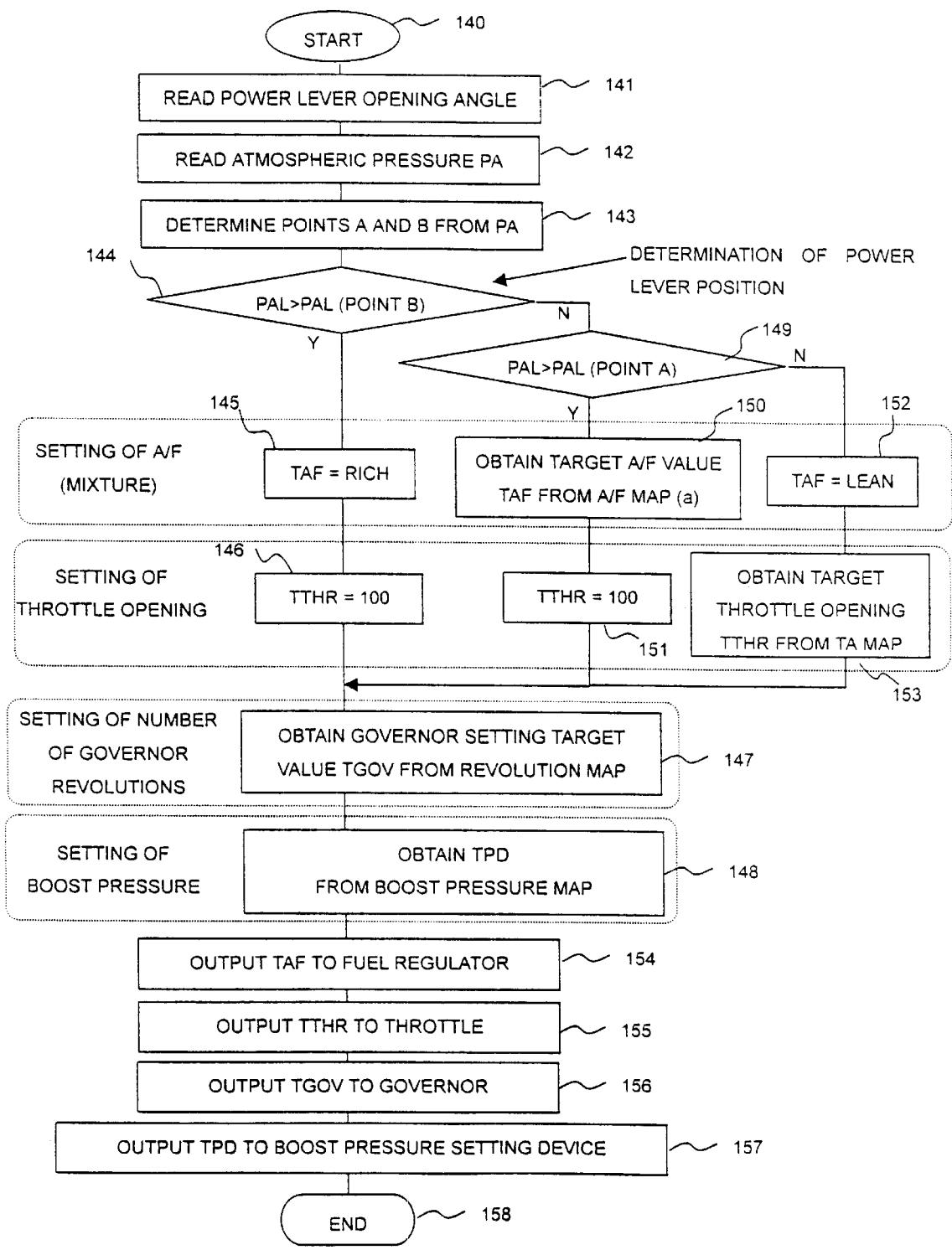
FIG. 18 is a flowchart of an engine control process in which partial power is set in a gasoline reciprocating engine with a turbocharger through setting of the power control lever opening angle according to the airplane engine control method in one embodiment of the present invention, the process comprising reducing the boost pressure to reduce the output to predetermined partial power, and thereafter performing control for a leaned setting of the air-fuel ratio to further reduce the power.

A control process in which atmospheric density compensation is performed by using the air pressure sensor 51 based on the method of controlling an airplane engine with a turbocharger according to this embodiment will now be described with reference to the flowchart of FIG. 18.

After a start of control in step S140, the angle of the power control lever 24 operated by a pilot is read by the lever opening angle sensor 25, and the ECU 26 reads and stores the angle value of the power control lever 24 in step S141.

In step S142, the air pressure sensor 51 measures the atmospheric pressure, and the ECU 26 reads and stores the measured value of the atmospheric pressure.

Figure 13:
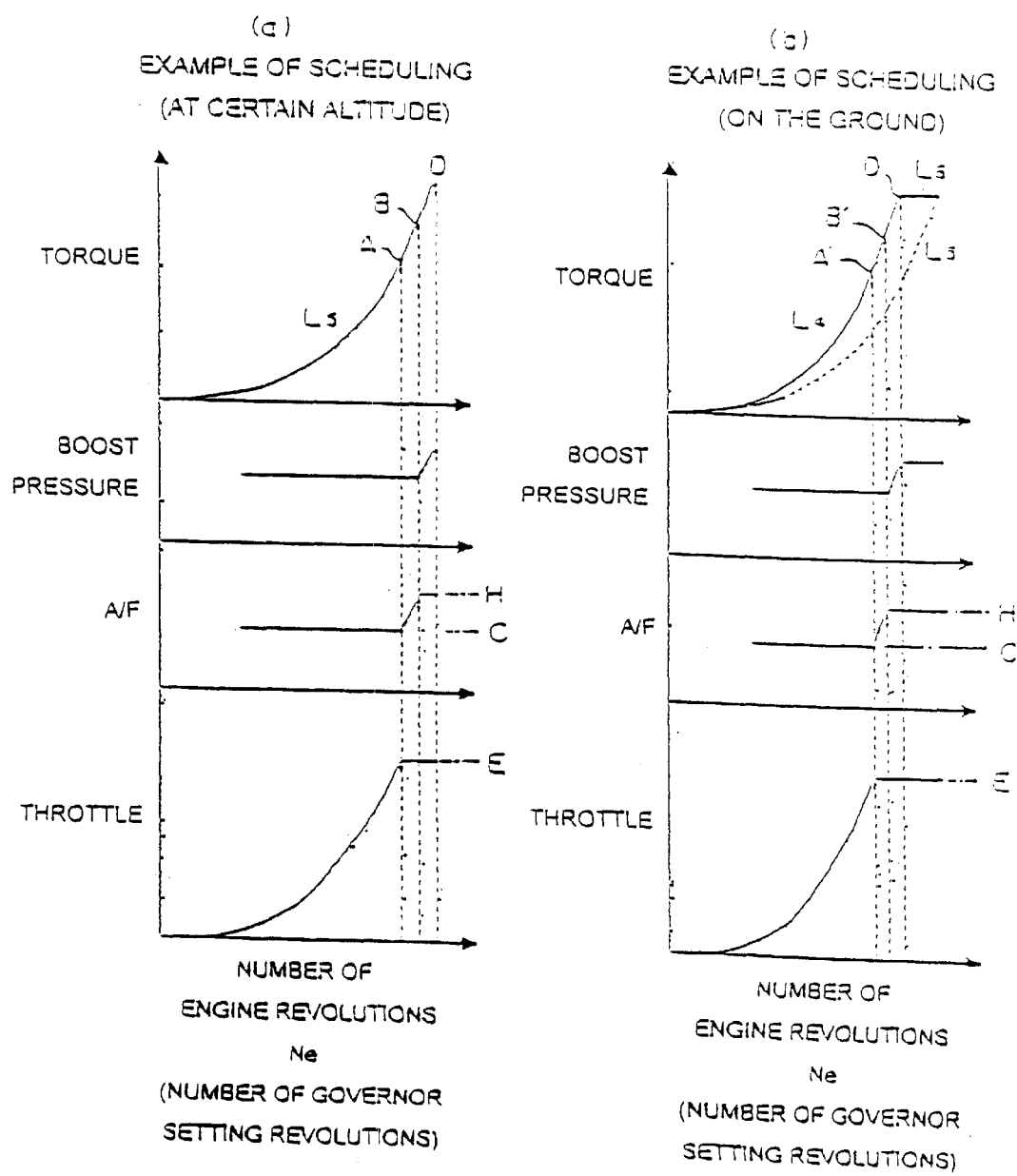
FIGS. 13(a) and 13(b) are diagrams showing an example of scheduling at a certain altitude and an example of scheduling on the ground, respectively, of partial power control with respect to a gasoline reciprocating engine with a turbocharger according to the airplane engine control method in one embodiment of the present invention.

Next, in step S143, points A(A') and B(B') shown in FIGS. 13(*a*) and 13(*b*) are determined on the basis of angle values of the power control lever.

Point A is a lean burn limit point in air-fuel ratio control, and point B is a predetermined point to which the turbocharger boost pressure is reduced. Points A and B are determined on the basis of a map of power control lever angle values and boost pressure values and a map of power control lever angle values and air-fuel ratio values, previously stored in the ECU 26. Points A' and B' in the case of control of a fright near the ground, as shown in FIG. 13(*b*), are determined as described below. The torque value at point D in the case of 100% power, the torque value at point B in the case of reaching point B by reducing the boost pressure, the torque value at point A in the case of reaching point A by reducing the air-fuel ratio, as shown in FIG. 13(*a*), are previously determined and the proportion of the value at point B to that at point D and the proportion of the value at point A to that at point D are computed. Then, under the condition of the reduced number of revolutions according to the reduction in atmospheric density $\rho$, values having the above-described proportions to the value at 100% power point D are computed to obtain points A' and B'.

In step S144, a determination is made from the power control lever angle as to whether the predetermined partial power selected by the pilot is larger than the partial power at point B. If it is determined in step S144 that the selected partial power is larger than the partial power at point B, a target air-fuel ratio value TAF is obtained in step S145 from the air-fuel ratio control map prepared in the ECU 26. In this case, rich-mixture control is performed as necessary air-fuel ratio control.

Next, in step S146, a target throttle opening which the throttle 21 should have is set. In this embodiment, the control system is arranged so that, when the turbocharger boost pressure is reduced, partial power is obtained by performing control for an enriched setting of the air-fuel ratio in the engine while maintaining a wide-open throttle (WOT) condition. Accordingly, a target throttle opening TTHR of 100 (wide-open condition) is set.

On the other hand, if it is determined in step S144 that the present angle PAL of the power control lever 24 is not larger than the power control lever angle PAL (point B) corresponding to point B, and that the partial power selected by the pilot is not larger than the partial power at point B, the selected partial power is compared in step S149 with the partial power corresponding to point A corresponding to the lean burn limit. In this case, if it is thereby determined that the selected partial power is larger than the partial power corresponding to point A, a target air-fuel ratio control value TAF is obtained in step S150 from the air-fuel ratio map in the ECU 26. Since in this case the partial power is to be obtained by performing boost and air-fuel ratio control while maintaining the wide-open throttle condition, a target throttle opening TTHR of 100 (wide-open condition) is set.

If it is determined in step S149 that the partial power selected by the pilot is not larger than the partial power corresponding to point A, lean-mixture control is first selected as necessary air-fuel ratio control in step S152, and a target throttle opening is determined in step S153. In this case, a target throttle opening TTHR is obtained from the target throttle opening TA map held in the ECU 26.

Thereafter, in any of the above-described cases, the number of revolutions of the governor 23 is set in step S147. In this embodiment, the power control lever 24 and the governor 23 are connected by a link mechanism, and a target value TGOV for setting the governor 23 is obtained from a prepared revolution map by referring to the angle of the power control lever 24.

Then, in step S148, a boost pressure to be set by the turbocharger boost pressure setting device 47 is obtained. A target boost pressure value TPD is obtained from a boost pressure map held in the ECU 26.

Thereafter, in step S154, the air-fuel ratio value obtained in step S145, 150, or 152 according to the above-described condition is set in the fuel regulator 22 to perform air-fuel ratio control. In step S155, the target throttle opening value TTHR obtained in step S146, 151, or 153 according to the above-described condition is set in the throttle to perform throttle control.

Further, in step S156, the governor setting target value TGOV obtained in step S147 is output to the governor 23 to perform control of the number of engine revolutions. Finally, in step S157, the target boost pressure TPD obtained in step S148 is set in the boost pressure setting device 47. In step S158, the control process according to this embodiment ends.

Thus, the target air-fuel ratio TAF, the target throttle opening TTH, the target number of governor revolutions TGOV and the target boost pressure TPD are output to and set in the fuel regulator 22, the throttle 21, the governor 23 and the boost pressure setting device 47, respectively, to enable engine control such that the propeller efficiency is maximized with respect to predetermined partial power and the fuel efficiency of the engine is satisfactorily high.

Engine control is performed in the above-described manner to set a propeller efficiency maximum condition with predetermined partial power, thereby enabling partial-power operation in such a condition that the operating efficiency of the airframe and the engine as a whole including the propeller efficiency is maximized.

Figure 19:
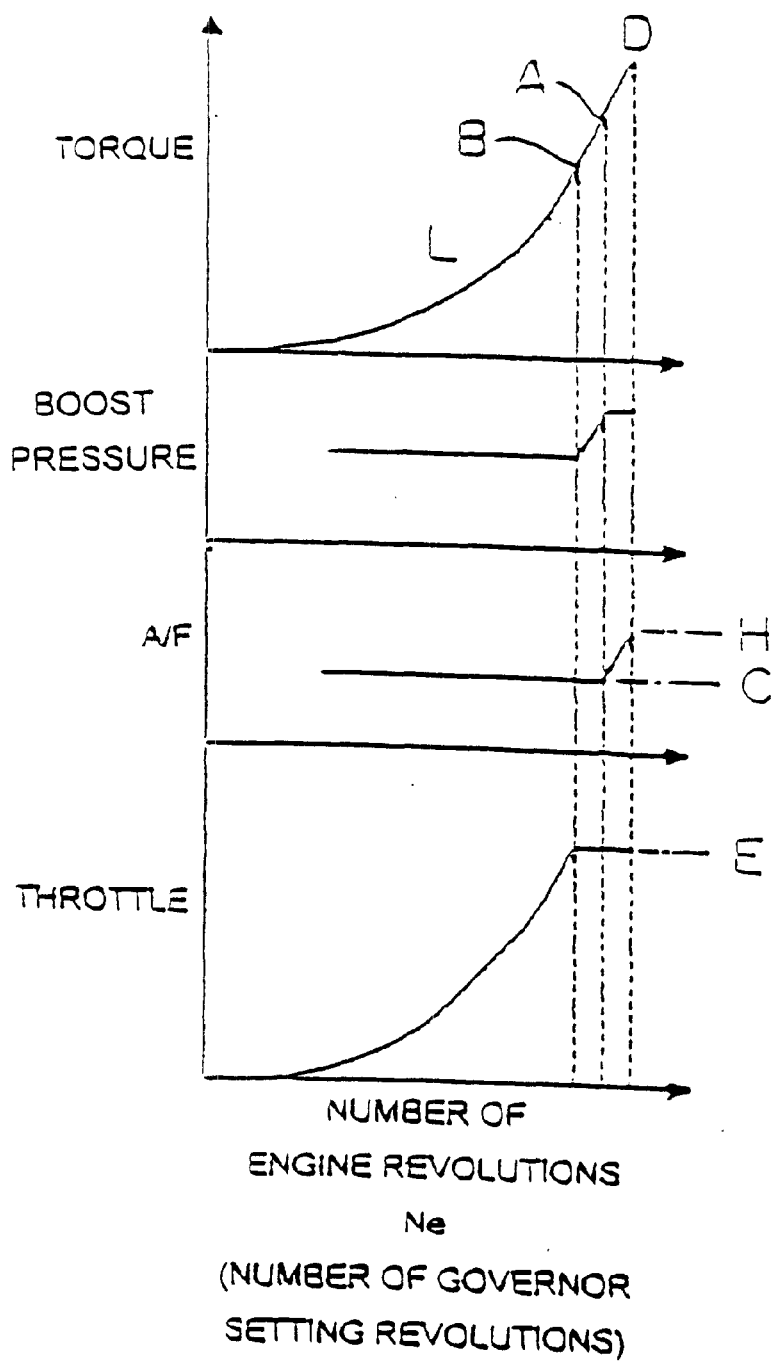
FIG. 19 is a diagram relating to an engine control process in which partial power is set in a gasoline reciprocating engine with a turbocharger through setting of the power control lever opening angle according to the airplane engine control method in one embodiment of the present invention, the graph showing an example of scheduling of a step of reducing the output to predetermined partial power by performing control for a leaned setting of the air-fuel ratio, and a step of further reducing the power by reducing the boost pressure.
Figure 20:
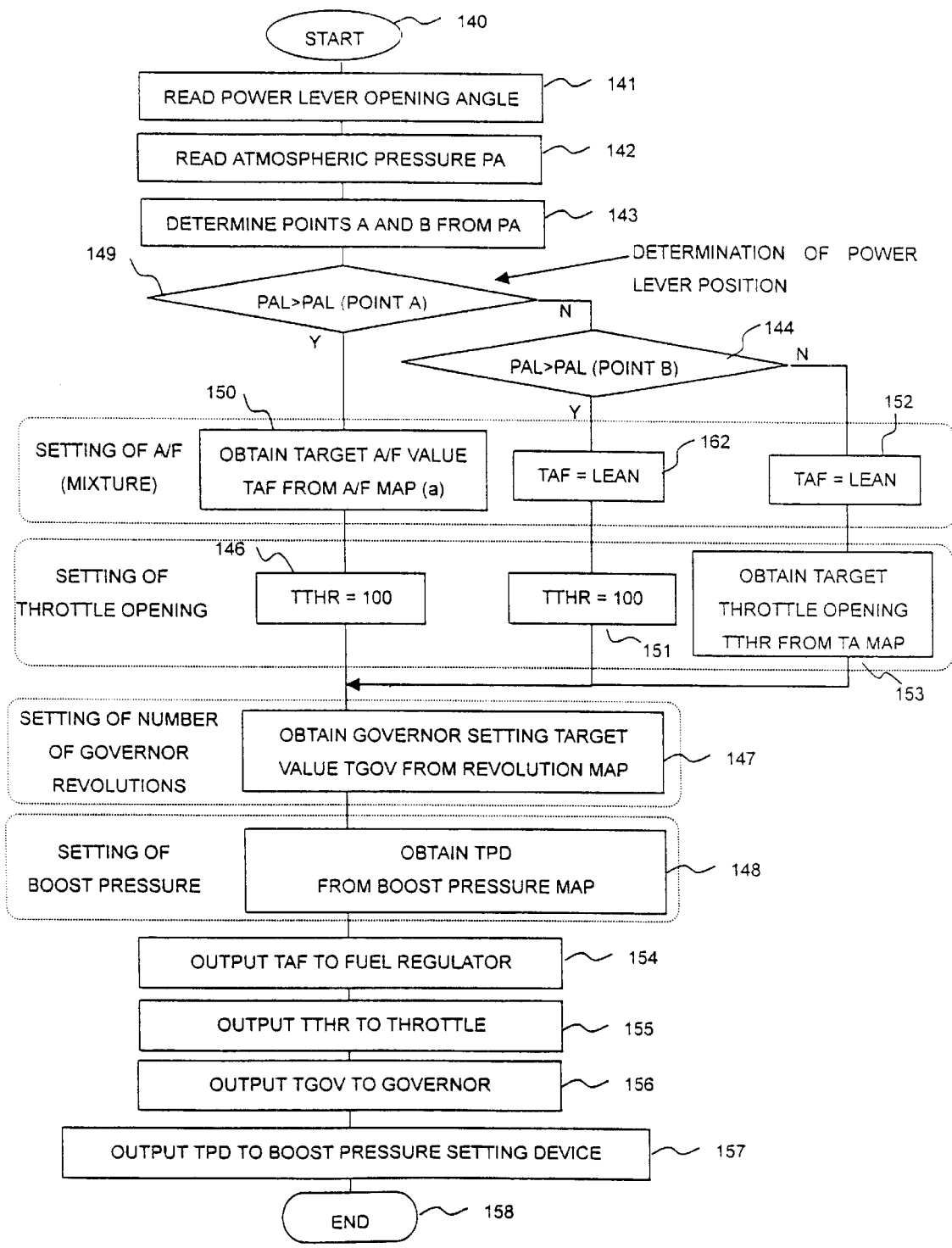
FIG. 20 is a flowchart of an engine control process in which partial power is set in a gasoline reciprocating engine with a turbocharger through setting of the power control lever opening angle according to the airplane engine control method in one embodiment of the present invention, the process comprising performing control for a leaned setting of the air-fuel ratio to reduce the output to predetermined partial power, and thereafter reducing the boost pressure to further reduce the power.

FIGS. 19 and 20 show one embodiment of the present invention represented by another example of the method of controlling an airplane engine with a turbocharger.

The difference of this embodiment from the preceding embodiment is as described below. In the preceding embodiment, the control process for setting partial power is such that the boost pressure is reduced to obtain partial power between the 100% power and predetermined partial power, and control for a leaned setting of the air-fuel ratio is thereafter performed to obtain the desired partial power before a control point corresponding to a lean burn limit is reached. In this embodiment, as shown in the graph of FIG. 19, the power is reduced by performing control for a leaned setting of the air-fuel ratio to obtain partial power before a point A corresponding to a lean burn limit is reached, and the power is thereafter reduced by reducing the boost pressure from point A to a suitable boost pressure reduction point B, thereby obtaining the desired partial power. In other respects, the configuration of the control apparatus and the control process are the same as those of the preceding embodiment.

FIG. 20 shows a flowchart of the control process of this embodiment.

Referring to FIG. 20, after a start of control in step S140, the opening angle value of the power control lever 24 is read to the ECU 26 in step S141, and the atmospheric pressure value is read to the ECU 26 in step S142. In step S143, points A and B are determined. If it is determined in step S149 that the selected partial power is larger than the partial power at point A, a target air-fuel ratio TAF is obtained in step S150, and a target throttle opening TTHR of 100 is set in step S146.

If it is determined in step S49 that the selected partial power is not larger than the partial power at point A, a determination is made in step S144 as to whether the selected partial power is larger than the partial power at point B.

If it is determined that the selected partial power is larger than the partial power at point B, that is, the selected partial power is between the partial power at point A and the partial power at point B, the target air-fuel ratio TAF is determined as "lean" in step S162. Thereafter, in step S151, a target throttle opening TTHR of 100 is set, as in step S146.

If it is determined in step S144 that the selected partial power is not larger than the partial power at point B, the target air-fuel ratio TAF is also determined as "lean" in step S152. Then, in this case, a target throttle opening is obtained from the TA map in step S153.

Thereafter, the number of governor revolutions TGOV is obtained in step S147 with respect to any of the above-described three different partial power conditions, as in the preceding embodiment. In step S148, a target boost pressure TPD is obtained. Thereafter, in step S154, the air-fuel ratio value obtained in step S150, 162, or 152 according to the above-described condition is set in the fuel regulator 22 to perform air-fuel ratio control, as in the preceding embodiment. In step S155, the target throttle opening value TTHR obtained in step S146, 151, or 153 according to the above-described condition is set in the throttle to perform throttle control.

Further, in step S156, the governor setting target value TGOV obtained in step S147 is output to the governor 23 to perform control of the number of engine revolutions. Finally, in step S157, the target boost pressure TPD obtained in step S148 is set in the boost pressure setting device 47. In step S158, the control process according to this embodiment ends.

Figure 21:
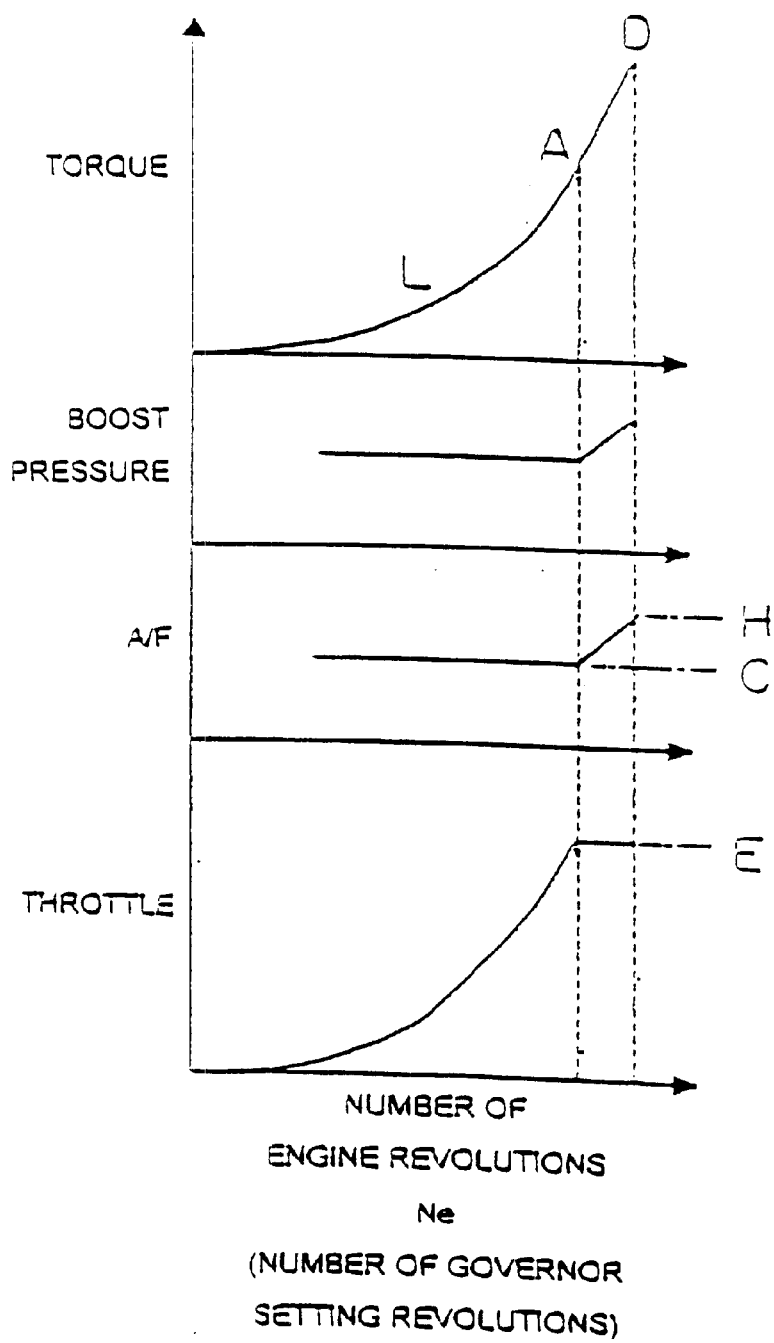
FIG. 21 is a diagram relating to an engine control process in which partial power is set in a gasoline reciprocating engine with a turbocharger through setting of the power control lever opening angle according to the airplane engine control method in one embodiment of the present invention, the graph showing an example of scheduling of reducing the engine power by performing control for a leaned setting of the air-fuel ratio and by simultaneously reducing the boost pressure.
Figure 22:
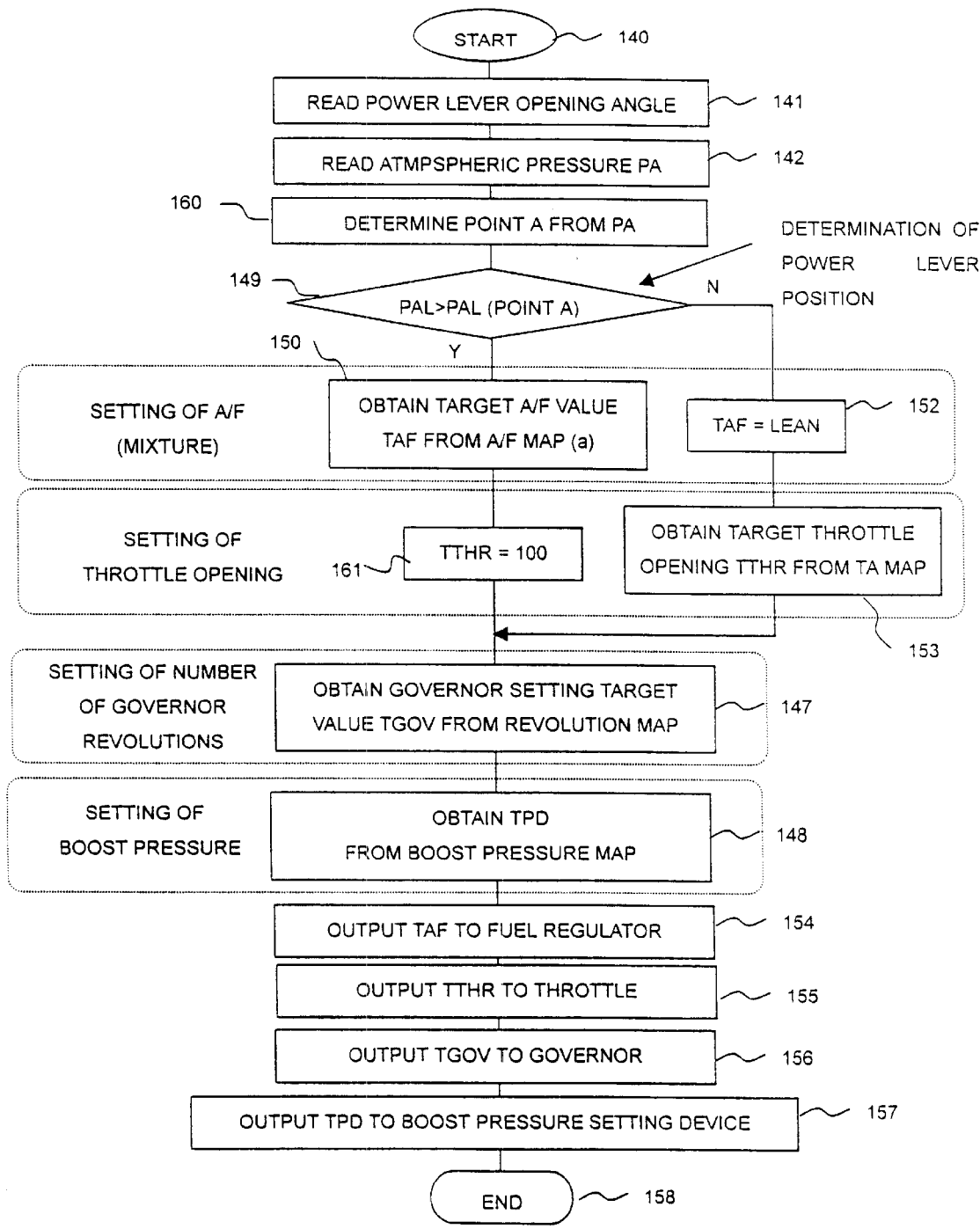
FIG. 22 is a flowchart of an engine control process in which partial power is set in a gasoline reciprocating engine with a turbocharger through setting of the power control lever opening angle according to the airplane engine control method in one embodiment of the present invention, the process comprising reducing the engine power by performing control for a leaned setting of the air-fuel ratio and by simultaneously reducing the boost pressure.

FIG. 21 and 22 show another embodiment of the present invention in which both the boost pressure value and the air-fuel ratio value are simultaneously reduced to obtain the desired partial power.

Referring to FIG. 21, in this embodiment, the power is reduced to a point A corresponding to a lean burn limit by reducing the boost pressure and by simultaneously performing control for a leaned setting of the air-fuel ratio. In this embodiment, point A, which corresponds to a lean burn limit, also corresponds to predetermined value to which the boost pressure is reduced.

Referring to the flowchart of FIG. 22, after a start of control in step S140, the opening angle value of the power control lever 24 is read to the ECU 26 in step S141, and the atmospheric pressure value is read to the ECU 26 in step S142. In step S160, point A is determined. If it is determined in step S149 that the selected partial power is larger than the partial power at point A, a target air-fuel ratio TAF is obtained in step S150, and a target throttle opening TTHR of 100 is set in step S165. If it is determined in step S149 that the selected partial power is not larger than the partial power at point A, the target air-fuel ratio TAF is determined as "lean" in step S152. Then, in step S153, a target throttle opening TTHR is obtained from the TA map in the ECU 26.

Thereafter, the number of governor revolutions is set to TGOV in step S147 with respect to any of the above-described different partial power conditions, as in the preceding embodiment. In step S148, a target boost pressure TPD is obtained. Thereafter, in step S154, the air-fuel ratio value obtained in step S150 according to the above-described condition is set in the fuel regulator 22 to perform air-fuel ratio control, or lean-mixture control is performed. In step S155, the target throttle opening value TTHR obtained in step S161 or 153 according to the above-described condition is output to and set in the throttle to perform throttle control.

Further, in step S156, the governor setting target value TGOV obtained in step S147 is output to the governor 23 to perform control of the number of engine revolutions. Finally, in step S157, the target boost pressure TPD obtained in step S148 is set in the boost pressure setting device 47. In step S158, the control process according to this embodiment ends.

Figure 23:
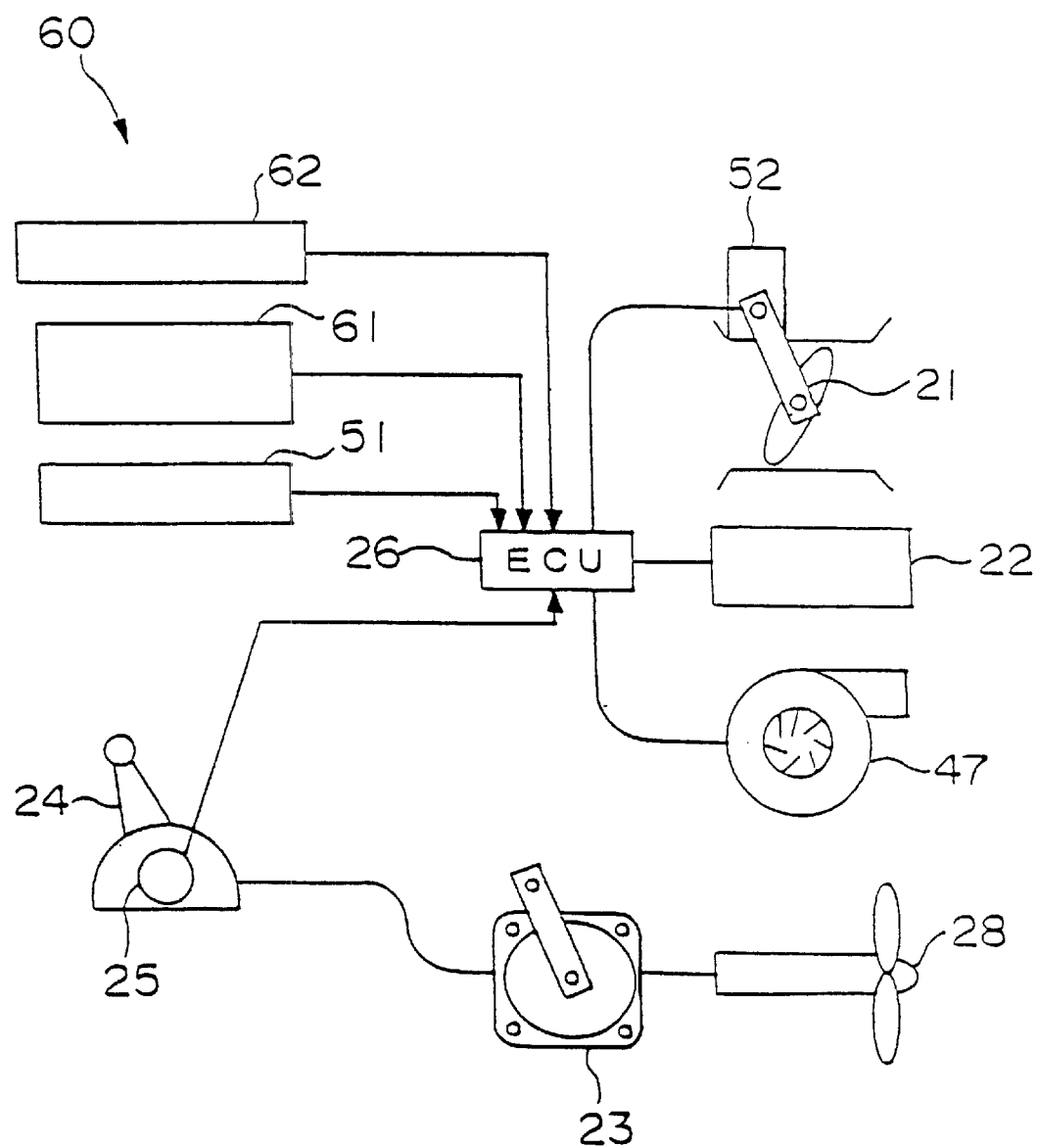
FIG. 23 is a diagram schematically showing an engine control apparatus according to the airplane engine control method in one embodiment of the present invention, the apparatus having a mechanism capable of correcting the engine torque and the number of engine revolutions so as to enable the airplane to fly with partial power in a propeller efficiency maximum condition even when the drag of airplane changes due to, for example, a change in the load on the airplane.

FIG. 23 shows a further embodiment of the present invention represented by a control system 60 for controlling a gasoline reciprocating engine with a turbocharger. The control system 60 is capable of correcting the engine torque and the number of engine revolutions when the drag of airplane of an airplane is changed. The control system 60 enables the airplane to fly with partial power in such a condition that the propeller efficiency is maximized even when the drag of airplane is changed.

The control system 60 of this embodiment has basically the same configuration as the control system 50 of the above-described embodiment. However, the control system 60 is arranged in such a manner that compensation with respect to the atmospheric density ρ is performed by the air pressure sensor 51, the ECU 26 and the throttle actuator 52 driven by the ECU 26, and that, with respect to predetermined partial power selected by a pilot operating the power control lever 24, the engine torque and the number of engine revolutions are set so as to maintain a propeller efficiency maximum condition, while atmospheric density compensation is performed.

In this embodiment, an airframe speed sensor 62 and an engine revolution sensor 61 are further provided. The speed V of the airplane when predetermined partial power is set is measured with the speed sensor 62, and the number of engine revolutions NE is measured with the engine revolution sensor 61. The measured values are read to the ECU 26. In other respects, the control system 60 is the same as the control system 50 of the above-described embodiment.

Figure 24:
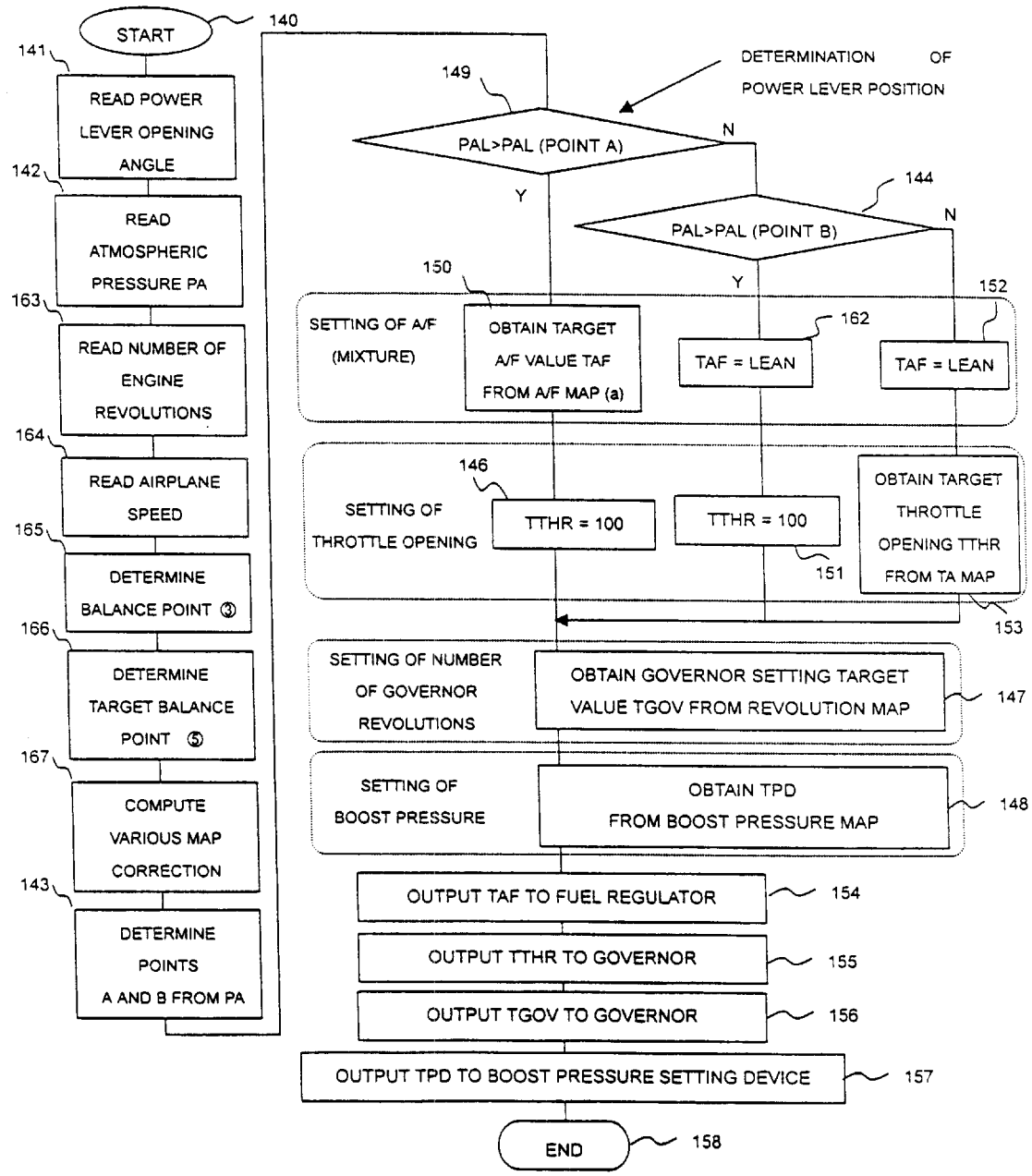
FIG. 24 is a flowchart of a flowchart of an engine control process in which partial power is set in a gasoline reciprocating engine with a turbocharger by selecting the power control lever opening angle according to the airplane engine control method in one embodiment of the present invention, the process enabling correction of the engine torque and the number of engine revolutions such that the airplane can fly with partial power in a propeller efficiency maximum condition even when the drag of airplane changes due to, for example, a change I the load on the airplane.
Figure 25:
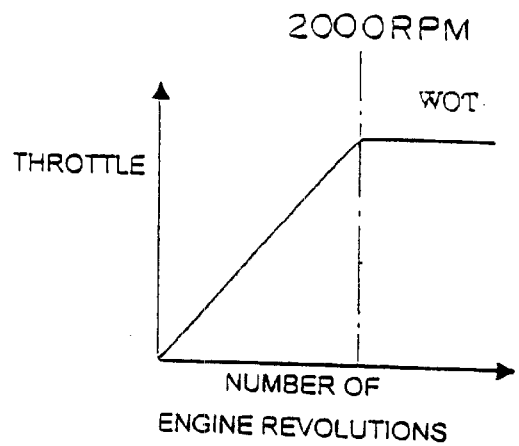
FIG. 25 is a graph showing the relationship between the throttle and the number of engine revolutions in a normal aspiration airplane engine with a variable-pitch propeller designed so that the throttle opening and the set number of governor revolutions are simultaneously controlled with one lever.
Figure 26:
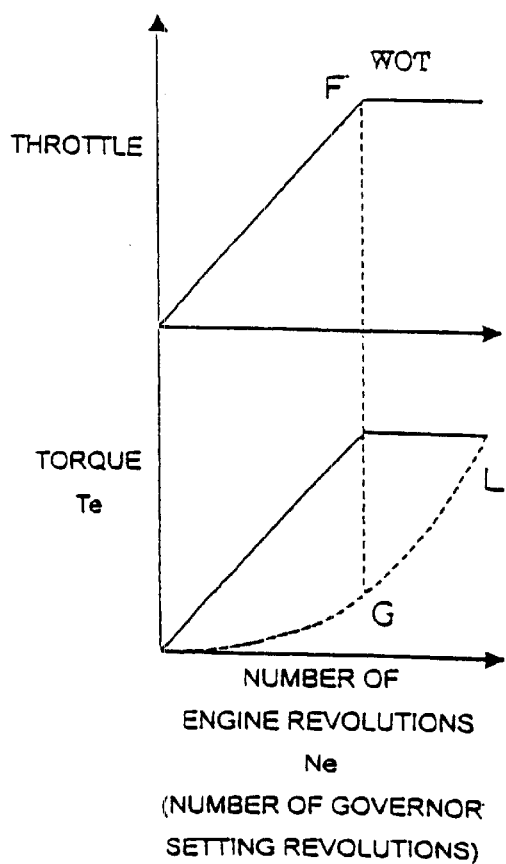
FIG. 26 is a graph showing the relationship between the throttle and the number of engine revolutions in a conventional normal-aspiration airplane engine with a variable-pitch propeller designed so that the throttle opening and the set number of governor revolutions are simultaneously controlled with one lever, the graph also showing, in contrast with the throttle-engine revolution relationship, a maximum propeller efficiency line supposed from the relationship between the torque and the number of engine revolutions.

FIG. 24 is a flowchart of a control process based on an airplane engine control method according to this embodiment, showing an example of correction with respect to a change in the drag of airplane in a case where the load on an airplane is reduced.

The control process according to this embodiment is formed on the basis of the configuration and step order of the process of the embodiment shown in FIG. 20.

That is, referring to FIG. 19, when a pilot operates the control system to set partial power between a 100% power point and point A corresponding to a lean burn limit, control for a leaned setting of the air-fuel ratio is performed to obtain the partial power. When the pilot operates the control system to set partial power between point A corresponding to a lean burn limit and point B corresponding to a predetermined value to which the boost pressure is reduced, control for a leaned setting of the air-fuel ratio and reducing of the boost pressure of the turbocharger are performed to obtain the desired partial power.

In this embodiment, after a start of control in step S140 in the control flowchart, the opening angle value of the power control lever 24 is read to the ECU 26 in step S141, and the atmospheric pressure value is read to the ECU 26 in step S142. Thereafter, in step S163, the number of engine revolutions is read to the ECU 26.

Figure 1:
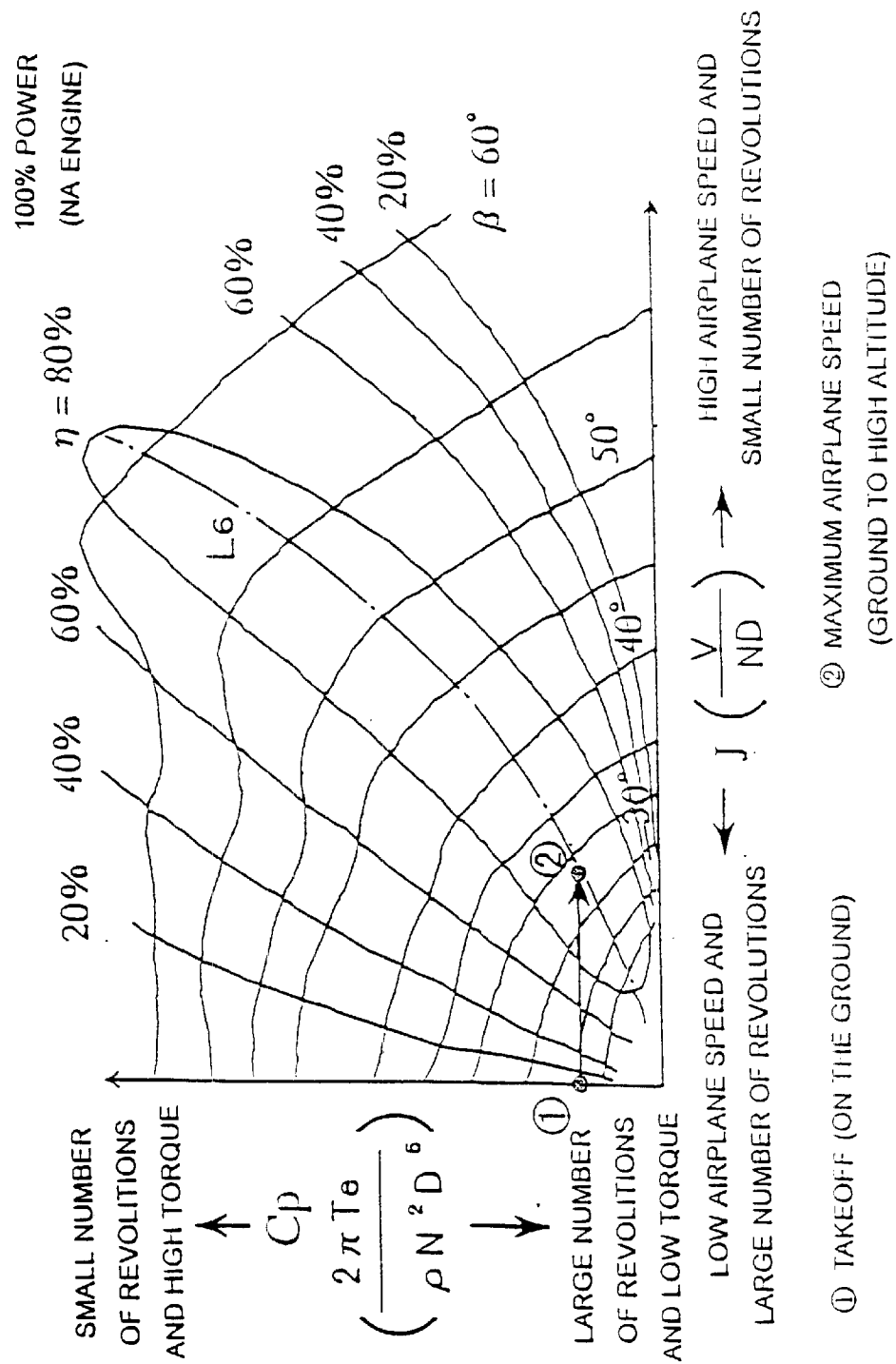
FIG. 1 is a graph which shows the principle of the airplane engine control method of the present invention, in which power coefficient Cp, advance ratio J, propeller efficiency (%) and propeller pitch angle β are non-dimensionally expressed, and which shows a full-power condition of an airplane having a normal-aspiration gasoline reciprocating engine from a takeoff to a maximum-speed mode.
Figure 2:
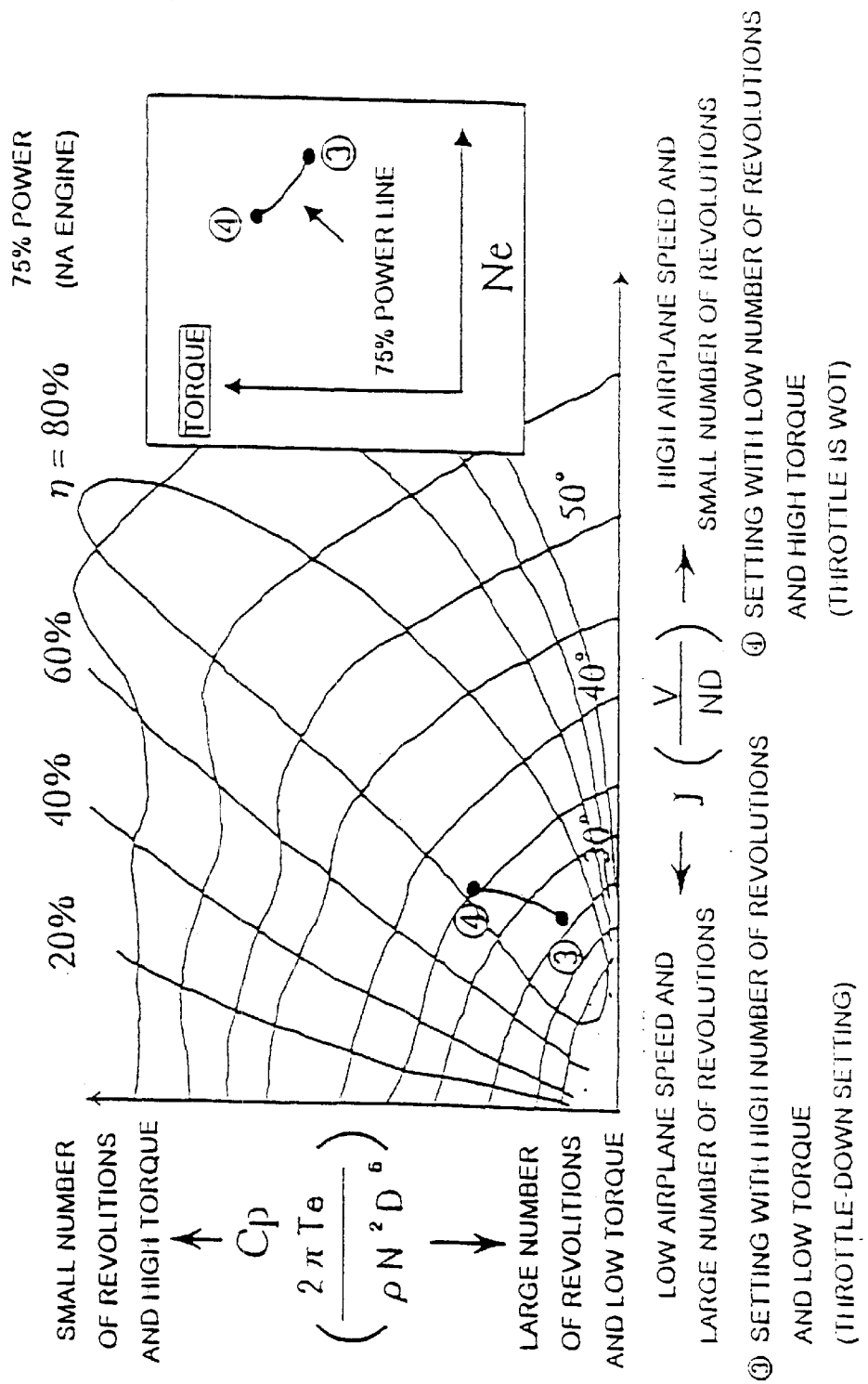
FIG. 2 is a graph which shows the principle of the airplane engine control method of the present invention, in which power coefficient Cp, advance ratio J, propeller efficiency (%) and propeller pitch angle β are non-dimensionally expressed, and which shows a 75% power condition of the airplane shown in FIG. 1.
Figure 3:
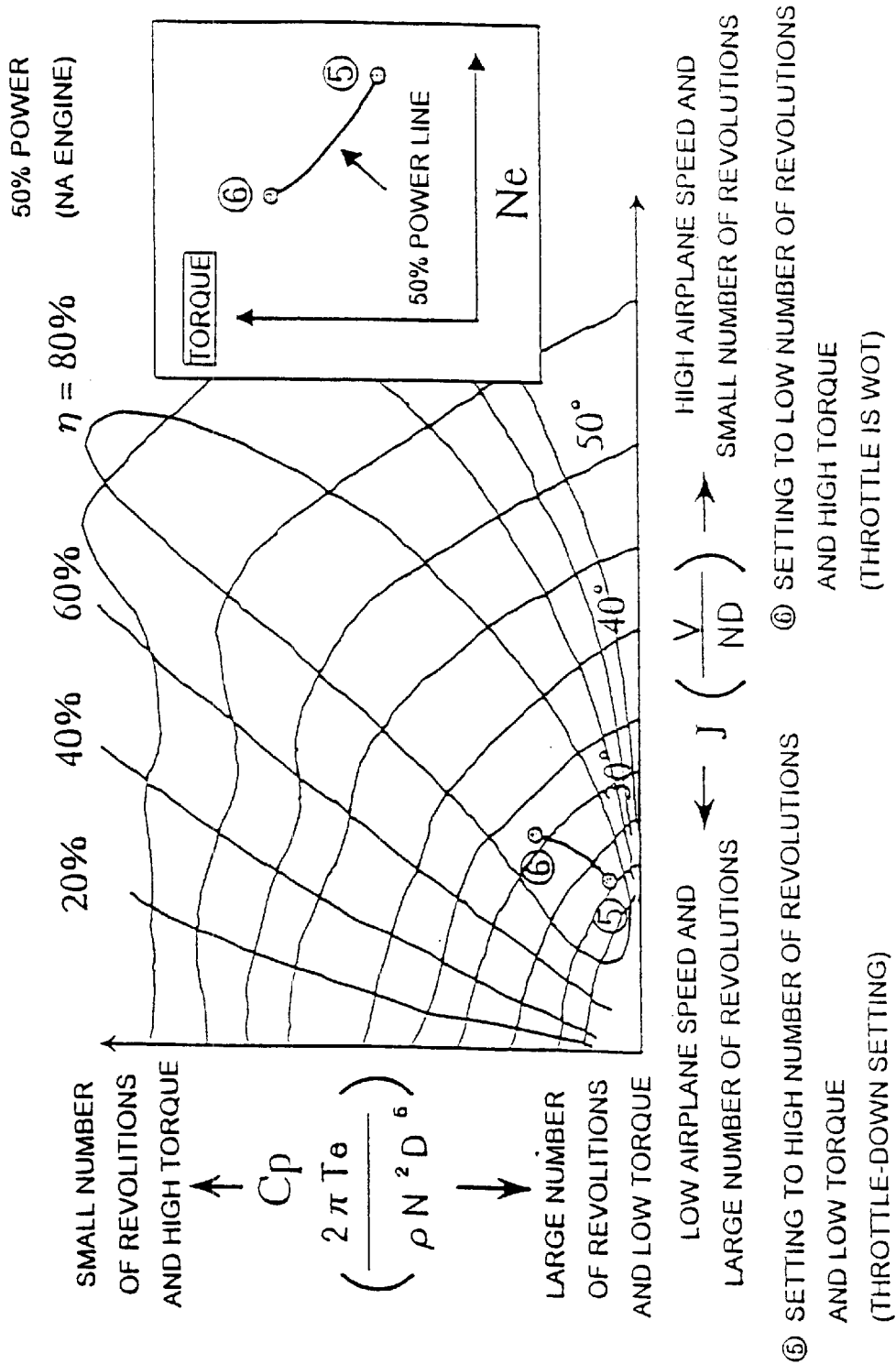
FIG. 3 is a graph which shows the principle of the airplane engine control method of the present invention, in which power coefficient Cp, advance ratio J, propeller efficiency (%) and propeller pitch angle β are non-dimensionally expressed, and which shows a 50% power condition of the airplane shown in FIG. 1.
Figure 4:
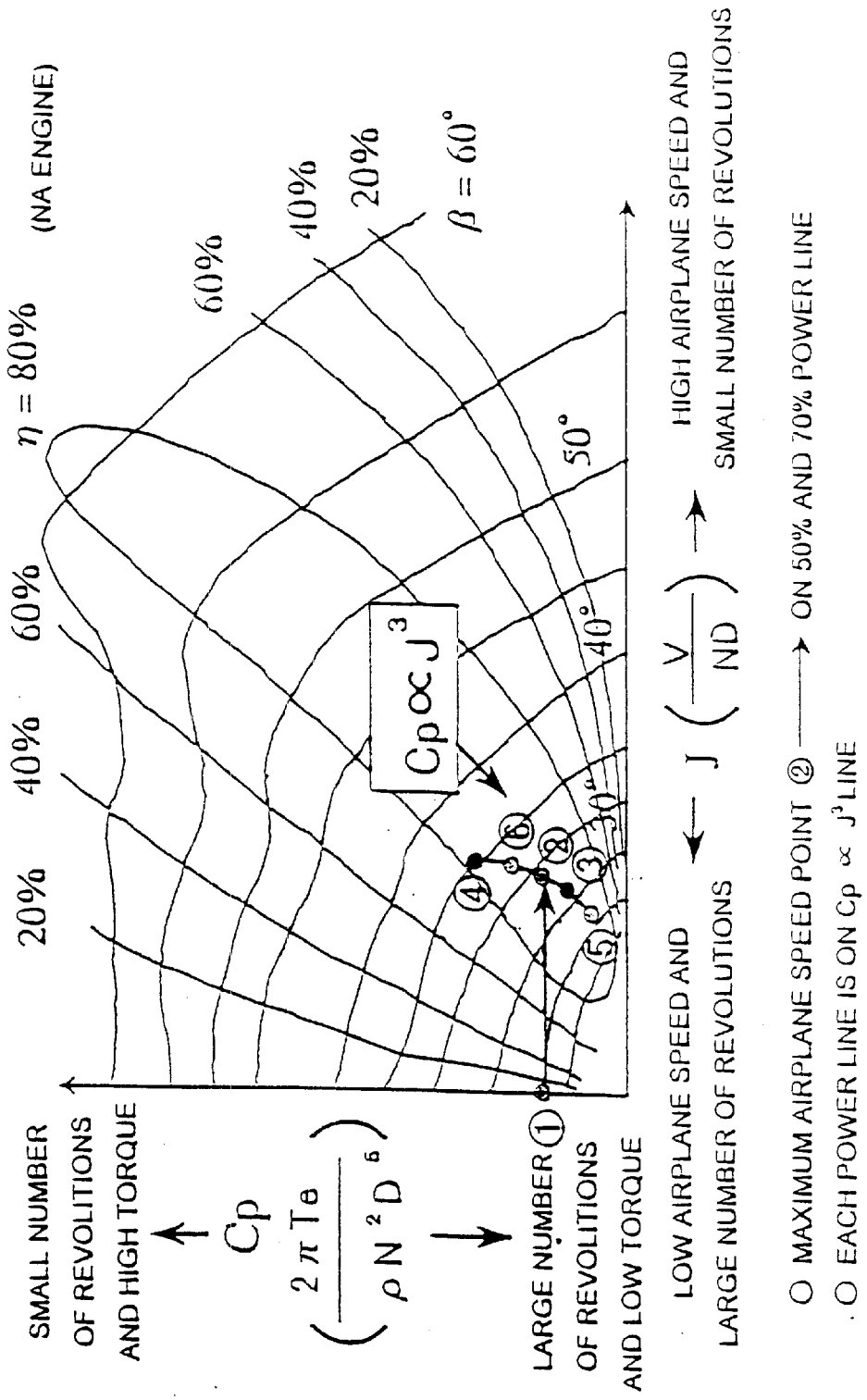
FIG. 4 is a graph which shows the principle of the airplane engine control method of the present invention, in which power coefficient Cp, advance ratio J, propeller efficiency (%) and propeller pitch angle β are non-dimensionally expressed, and which shows a state in which Cp $j^3$ line is formed by plotting the points in FIGS. 1 to 3 in full-power, 75%-power and 50%-power conditions of the airplane.
Figure 5:
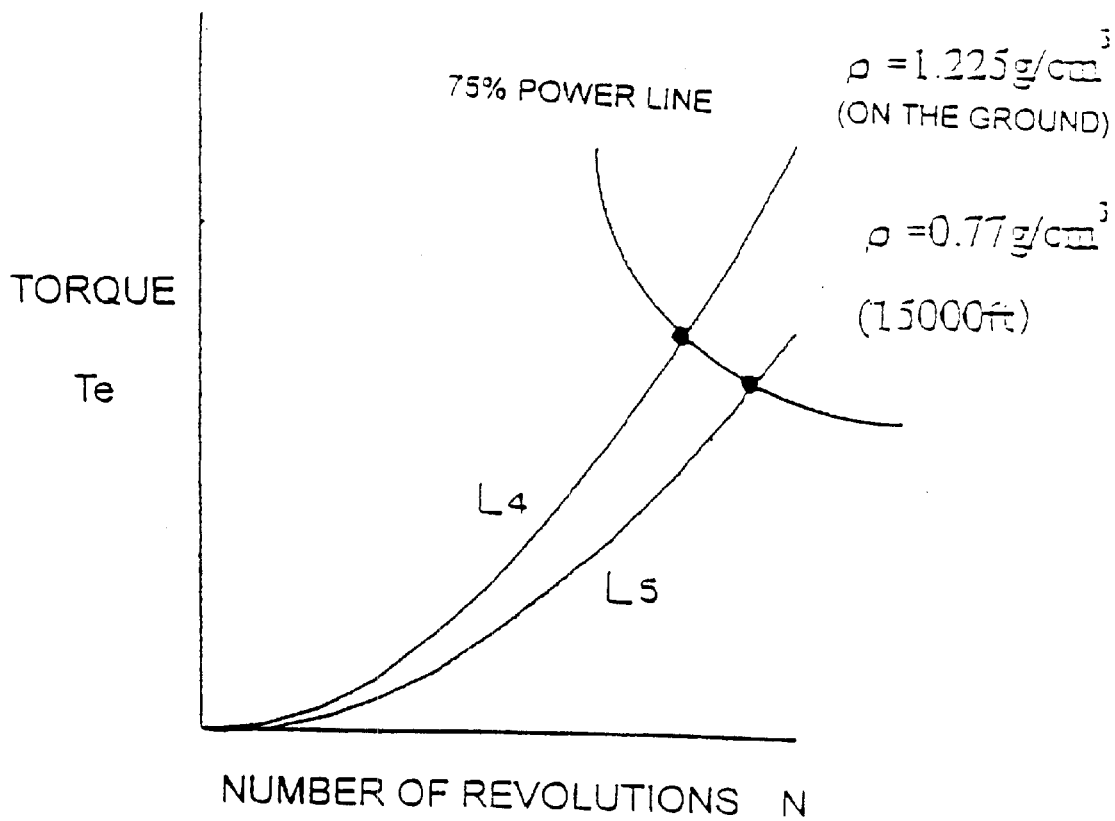
FIG. 5 is a graph showing a state in which the relationship between the number of engine revolutions and the engine torque is as expressed by Te $\rho N^2$ in a case where the airplane engine control method of the present invention is applied to a gasoline reciprocating engine with a turbocharger, the graph showing a line under a ground atmospheric density condition, a line under a high-altitude atmospheric density condition, and propeller efficiency maximum points under a 75%-power condition.
Figure 6:
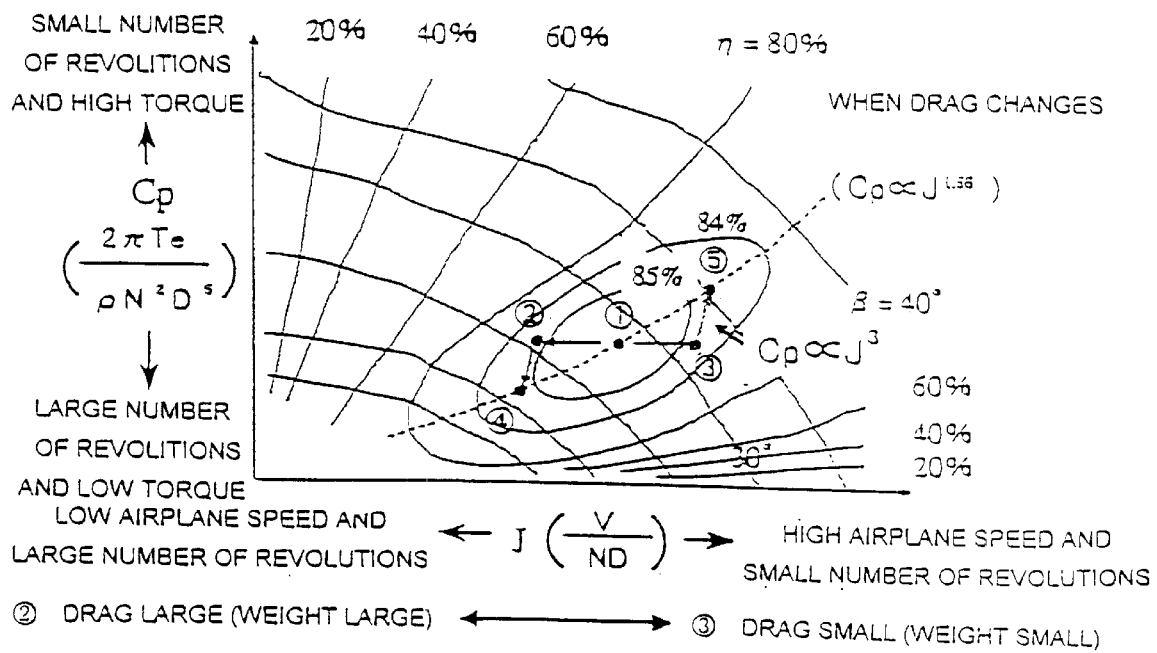
FIG. 6 is a graph which shows the principle of the airplane engine control method of the present invention, in which power coefficient Cp, advance ratio J, propeller efficiency (%) and propeller pitch angle β are non-dimensionally expressed, and which shows balance points when the drag of airplane changes, and a correction point at which the propeller efficiency is maximized after the drag of airplane has changed.

That is, in a case where the drag of airplane has changed due to a reduction in the weight of the airplane, the number of engine revolutions measured with the engine revolution sensor 61 in step S163 when the drag of airplane changed is read to the ECU 26 to determine the balance point ③ after the weight change from the design-center balance point ①, as shown in FIG. 6. In step S164, the airframe speed measured with the airframe speed sensor 62 is also read to the ECU 26. The propeller diameter D is added to the above-described data, and the advance ratio J is computed by the equation shown below, as described above, and the present balance point ③ is determined from the advance ratio J.

$$J \text{ (Advance Ratio)} = V/N_D$$

Thereafter, in step S166, as shown in FIG. 6, the torque value and the number of engine revolutions are changed under the constant-power condition from the balance point ③ along a line formed generally based on the relationship: Cp ∝ J$^3$ to determine a point ⑤ of intersection with the propeller efficiency maximum line Cp ∝ J$^{1.66}$ stored in the RAM of the ECU 26. The engine torque and the number of engine revolutions corresponding to the point ⑤ are computed from the power coefficient Cp at the point ⑤.

In step S167, values for correction of the various maps in the ECU 26 of engine control factors, i.e., the air-fuel ratio, the throttle opening, the number of governor revolutions, the boost pressure, etc., related to the change from the balance point ① to the balance point ⑤, are computed to perform correction of the maps.

Thereafter, one of the region between the 100% power and point A (corresponding to the lean burn limit) and the region between point A and point B (corresponding to the predetermined value to which the turbocharger boost pressure is reduced) is determined as a region into which the predetermined partial power selected by the pilot operating the power control lever falls. According to the result of this determination, the control process proceeds, as does the corresponding control process of the above-described embodiment.

That is, in step S143 of the control flowchart, points A and B are determined on the basis of the above-described atmospheric pressure. If it is determined in step S149 that the selected partial power is larger than the partial power at point A, a target air-fuel ratio TAF is obtained in step S150, and a target throttle opening TTHR of 100 is set in step S146. If it is determined in step S149 that the selected partial power is not larger than the partial power at point A, a determination is made in step S144 as to whether the selected partial power is larger than the partial power at point B.

If it is determined that the selected partial power is larger than the partial power at point B, that is, the selected partial power is between the partial power at point A and the partial power at point B, the target air-fuel ratio TAF is determined as "lean" in step S162. Thereafter, in step S151, a target throttle opening TTHR of 100 is set, as in step S146.

If it is determined in step S144 that the selected partial power is not larger than the partial power at point B, the target air-fuel ratio TAF is also set as "lean" in step S152. Then, in this case, a target throttle opening is obtained from the TA map in step S153.

Thereafter, the number of governor revolutions is set to TGOV in step S147 with respect to any of the above-described three different partial power conditions, as in the above-described embodiment. In step S148, a target boost pressure TPD is set. Thereafter, in step S154, the air-fuel ratio value obtained in step S150, 162, or 152 according to the above-described condition is set in the fuel regulator 22 to perform air-fuel ratio control, as in the above-described embodiment. In step S155, the target throttle opening value TTHR obtained in step S146, 151, or 153 according to the above-described condition is set in the throttle to perform throttle control. Further, in step S156, the governor setting target value TGOV obtained in step S147 is output to the governor 23 to perform control of the number of engine revolutions. Finally, in step S157, the target boost pressure TPD obtained in step S148 is set in the boost pressure setting device 47. In step S158, the control process according to this embodiment ends.

Thus, in the airplane engine control method according to this embodiment, a propeller efficiency maximum point after the occurrence of a change in load is determined, the engine torque and the number of engine revolutions at the propeller efficiency maximum point are computed, and the engine torque and the number of engine revolutions are corrected under a constant-engine-power condition. Thus, engine control is performed so as to optimize the operating efficiency at the time of partial power setting after the occurrence of a change in load.

The embodiments of the present invention have been described with respect to applications of the airplane engine control method of the present invention to a normal aspiration type gasoline reciprocating engine and a gasoline reciprocating engine with a turbocharger. However, the present invention is not limited to the described embodiments, and can also be applied to diesel reciprocating engines.

The airplane engine control method of the present invention therefore enables an airplane having a diesel reciprocating engine and a variable-pitch propeller to fly by setting partial power in such a condition that the operating efficiency of the airframe and the engine as a whole, including the propeller efficiency as well as the fuel efficiency of the engine, can be maximized.

According to the present invention, engine control consisting of a combination of throttle control, air-fuel ratio control, engine rotational frequency control and boost pressure control is performed by using one operating lever. Therefore, the burden of engine control on a pilot can be markedly reduced.

We claim:

1. A method of controlling a reciprocating engine with a variable-pitch propeller provided on an airplane, in which suitable partial power is set in the engine by one operating lever, said method comprising setting an engine operating condition such that a relationship expressed by Te $\rho N^2$ is established with respect to the engine torque (Te), the number of engine revolutions (N) and the atmospheric density ($\rho$) of air when predetermined partial power is set in the engine.

2. A method according to claim 1, wherein the reciprocating engine is a normal aspiration engine, and an engine operating condition can be set such that a relationship expressed by Te $N^2$ is established between the engine torque (Te) and the number of engine revolutions (N) when predetermined partial power is set in the engine.

3. A method according to claim 2, wherein control of the partial power setting comprises air-fuel ratio control, throttle opening control and control of the number of engine revolutions, and wherein control before partial power corresponding to lean burn limit point is performed by maintaining a wide-open throttle condition and performing control for a leaned setting of the air-fuel ratio in the engine.

4. A method according to claim 3 wherein determination as to whether the selected partial power is equal to or larger than the engine power corresponding to the lean burn limit point is made on the basis of information on the opening angle of the operating lever.

5. A method according to claim 3 wherein determination as to whether the selected partial power is equal to or larger than the engine power corresponding to the lean burn limit point is made on the basis of the number of engine revolutions value.

6. A method according to claim 3, wherein, when partial power smaller than a partial power value corresponding to the lean burn limit point is selected, the engine output is set by performing such control as to reduce the throttle opening under a condition defined between a state where partial power is set in such a manner that the engine torque is kept constant by maintaining the wide-open throttle condition and maintaining a lean burn limit value tin air-fuel ratio control, and the number of engine revolutions is reduced, and a state where partial power is set by establishing a relationship expressed by Te $N^2$ between the engine torque value (Te) and the number of engine revolutions (N).

7. A method according to claim 6, wherein determination as to whether the selected partial power is equal to or larger than the engine power corresponding to the lean burn limit point is made on the basis of information on the opening angle of the operating lever.

8. A method according to claim 6, wherein determination as to whether the selected partial power is equal to or larger than the engine power corresponding to the lean burn limit point is made on the basis of the number of engine revolutions value.

9. A method according to claim 1, wherein the reciprocating engine has a turbocharger.

10. A method according to claim 9, wherein: control of the partial power setting is performed through air-fuel ratio control, throttle opening control, control of the number of engine revolutions and boost pressure control of turbocharger; partial power corresponding to a predetermined boost pressure reduction point is set by reducing the boost pressure while maintaining a wide-open throttle condition and an control condition for an enriched setting of the air-fuel ratio; and, if the engine power is reduced to a level lower than the partial power corresponding to the predetermined boost pressure reduction point, the partial power is set by performing lean-mixture control.

11. A method according to claim 10, wherein determination as to whether the selected partial power is equal to or larger than the engine power corresponding to the lean burn limit point, and as to whether the selected partial power is equal to or larger than the partial power corresponding to the predetermined boost pressure reduction point are made on the basis of information on the opening angle of the operating lever.

12. A method according to claim 9, wherein: control of the partial power setting is performed through air-fuel ratio control, throttle opening control, control of the number of engine revolutions and boost pressure control; the engine power is reduced to predetermined partial power by performing air-fuel ratio control based on control for a leaned setting of the air-fuel ratio while maintaining a wide-open throttle condition and a boost condition before a lean burn limit point is reached; and, if the engine power is reduced to a level lower than the partial power corresponding to the lean burn limit point, partial power is set by performing control of reducing the boost pressure.

13. A method according to claim 12, wherein determination as to whether the selected partial power is equal to or larger than the engine power corresponding to the lean burn limit point, and as to whether the selected partial power is equal to or larger than the partial power corresponding to the predetermined boost pressure reduction point are made on the basis of information on the opening angle of operating lever.

14. A method according to claim 9, wherein: control of the partial power setting is performed through air-fuel ratio control, throttle opening control, control of the number of engine revolutions and boost pressure control; predetermined partial power is set by performing air-fuel ratio control based on reducing the boost pressure, maintaining a wide-open throttle condition and performing control for a leaned setting of the air-fuel ratio before a lean burn limit point is reached; and, if the engine power is reduced to a level lower than the partial power corresponding to the learn burn limit point, control of reducing the throttle opening is performed.

15. A method according to claim 14, wherein determination as to whether the selected partial power is equal to or larger than the engine power corresponding to the lean burn limit point, and as to whether the selected partial power is equal to or larger than the partial power corresponding to the predetermined boost pressure reduction point are made on the basis of information on the opening angle of operating lever.

16. A method of controlling a reciprocating engine with a variable-pitch propeller provided on an airplane, in which partial power is set so that a relationship expressed by Te $\propto \rho N^2$ is established with respect to the engine torque (Te), the number of engine revolutions (N) and the atmospheric density ($\rho$), said method comprising setting the engine torque and the number of engine revolutions after change of the drag of airplane so that the propeller efficiency in the airplane can be maximized.

17. A method according to claim 16, wherein correction of the balance point to the propeller efficiency maximum point after change of the drag of airplane is performed in such a manner that the balance point after change of the drag of airplane, as plotted on a graph having the power coefficient Cp as the axis of ordinate and the advance ratio J as the axis of abscissa, is moved to the propeller efficiency maximum point by changing the combination of the number of engine revolutions and the engine torque value under a constant-power condition, and engine control is performed on the basis of the torque value and the number of engine revolutions at the propeller efficiency maximum point.

18. A method according to claim 16, further comprising the steps of determining a balance point at which the thrust of airplane and the drag of airplane balance with each other as a result of change of the drag of airplane in the relationship between a power coefficient Cp and an advance ratio J, and correcting the balance point to a propeller efficiency maximum point.

19. A method according to claim 18, wherein correction of the balance point to the propeller efficiency maximum point after change of the drag of airplane is performed in such a manner that the balance point after change of the drag of airplane, as plotted on a graph having the power coefficient Cp as the axis of ordinate and the advance ratio J as the axis of abscissa, is moved to the propeller efficiency maximum point by changing the combination of the number of engine revolutions and the engine torque value under a constant-power condition, and engine control is performed on the basis of the torque value and the number of engine revolutions at the propeller efficiency maximum point.

20. An apparatus for controlling a reciprocating engine with a variable-pitch propeller provided on an airplane, said apparatus comprising: a throttle unit for setting the amount of air supplied to the engine; a fuel regulator for controlling the air-fuel ratio for the engine; a governor for controlling the number of revolutions of the propeller; one power control lever capable of setting desired engine power; and control means provided in association with said operating lever, said throttle unit, said fuel regulator and said governor, said control means having an air-fuel ratio map, a throttle opening map and an engine revolution map formed so as to enable setting of an engine torque Te and a number of engine revolution N such that a relationship expressed by Te $\propto N^2$ is established, said control means being capable of outputting control values to said throttle unit, said fuel regulator and said governor by comparing information about partial power selected by said operating lever with each of the maps, the control values being such that the propeller efficiency is maximized when predetermined partial power is set.

21. An apparatus according to claim 20, further comprising a sensor for measuring the opening angle of said operating lever, wherein said control means includes means for outputting control values to said throttle unit, said fuel regulator and said governor by comparing each of the maps and partial power information including the opening angle value of said operating lever measured with said sensor, the control values being such that the propeller efficiency is maximized when the predetermined partial power is set.

22. An apparatus according to claim 20, further comprising a sensor for measuring the number of engine revolutions, wherein said control means includes means for outputting control values to said throttle unit, said fuel regulator and said governor by comparing each of the maps and partial power information including the number of revolutions measured with said sensor, the control values being such that the propeller efficiency is maximized when predetermined partial power is set.

23. An apparatus for controlling a reciprocating engine with a variable-pitch propeller and a turbocharger provided on an airplane, said apparatus comprising: a throttle unit for setting the amount of air supplied to the engine; a fuel regulator for controlling the air-fuel ratio for the engine; a governor for controlling the number of revolutions of the propeller; a boost pressure setting device capable of controlling the boost pressure of the turbocharger; one power control lever capable of setting desired engine power; measuring means for measuring the opening angle of the power control lever; and control means provided in association with said operating lever, said throttle unit, said fuel regulator and said governor, said control means having an air-fuel ratio map, a throttle opening map, a number of engine revolutions map and a boost pressure map set so as to enable setting of an engine torque Te and a number of engine revolutions N such that a relationship expressed by Te $\propto \rho N^2$ is established, said control means being capable of outputting control values to said throttle unit, said fuel regulator and said governor by comparing each of the maps and the opening angle value of said operating lever measured by said operating lever measuring means, the control values being such that the propeller efficiency is maximized when predetermined partial power selected by said operating lever is set.

24. An apparatus according to claim 23, further comprising an atmospheric density compensation mechanism provided between said power control lever and said throttle unit.

25. An apparatus according to claim 24, wherein said atmospheric density compensation mechanism is constituted of a bellows mechanism capable of adjusting the opening angle value of said operating lever in accordance with the air atmospheric density.

26. An apparatus according to claim 24, wherein said atmospheric density compensation mechanism has an atmospheric pressure sensor capable of measuring atmospheric pressure, a throttle actuator capable of adjusting the throttle opening, and control means capable of controlling the amount of drive of the throttle actuator on the basis of the value of atmospheric pressure measured with the atmospheric pressure sensor, said atmospheric density compensation mechanism being capable of controlling the opening angle of the operating lever in accordance with the atmospheric density.

* * * * *

UNITED STATES PATENT AND TRADEMARK OFFICE
CERTIFICATE OF CORRECTION

PATENT NO. : 6,468,035 B1
DATED : October 22, 2002
INVENTOR(S) : Yukio Otake and Shinichiro Tanaka It is certified that error appears in the above-identified patent and that said Letters Patent is hereby corrected as shown below:

Column 14,
Lines 31 and 50, after "Te" insert -- $\alpha$ --.

Column 15,
Line 19, after "Te" insert -- $\alpha$ --.

Column 18,
Lines 31, 38, 39, 44 and 51, after "Te" insert -- $\alpha$ --.

Column 19,
Line 3, after "Te" insert -- $\alpha$ --.

Column 25,
Lines 62 and 63, after "Cp" insert -- $\alpha$ --.

Column 27,
Lines 4, 5, and 11, after "Te" insert -- $\alpha$ --; and
Line 8, change "tin" to -- in --.

Column 28,
Line 8, change "an" (first occurrence) to -- a --.

Column 29,
Line 3, after "Te" insert -- $\alpha$ --.
Line 13, change "revolution" to -- revolution -- and after "Te" insert -- $\alpha$ --.

UNITED STATES PATENT AND TRADEMARK OFFICE
CERTIFICATE OF CORRECTION

PATENT NO.    : 6,468,035 B1
DATED         : October 22, 2002
INVENTOR(S)   : Yukio Otake and Shinichiro Tanaka It is certified that error appears in the above-identified patent and that said Letters Patent is hereby corrected as shown below:

Column 30,
Line 18, after "Te" insert -- α --.

Signed and Sealed this

Twenty-ninth Day of April, 2003

JAMES E. ROGAN
*Director of the United States Patent and Trademark Office*